United States Patent
Moon et al.

(10) Patent No.: US 10,042,754 B2
(45) Date of Patent: Aug. 7, 2018

(54) USER DEVICE INCLUDING A NONVOLATILE MEMORY DEVICE AND A DATA WRITE METHOD THEREOF

(71) Applicant: SAMSUNG ELECTRONICS CO., LTD., Suwon-si, Gyeonggi-do (KR)

(72) Inventors: Sangkwon Moon, Hwaseong-si (KR); Kyung Ho Kim, Seoul (KR); Seunguk Shin, Seoul (KR); Sung Won Jung, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/302,696

(22) Filed: Jun. 12, 2014

(65) Prior Publication Data

US 2014/0372678 A1 Dec. 18, 2014

(30) Foreign Application Priority Data

Jun. 12, 2013 (KR) ........................ 10-2013-0067228

(51) Int. Cl.
*G06F 12/02* (2006.01)
(52) U.S. Cl.
CPC .. *G06F 12/0246* (2013.01); *G06F 2212/7207* (2013.01); *Y02D 10/13* (2018.01)
(58) Field of Classification Search
CPC ................................................ G06F 12/0246
USPC ......................................................... 711/103
See application file for complete search history.

(56) References Cited

U.S. PATENT DOCUMENTS

| 5,822,597 A * | 10/1998 | Kawano | ............... G06F 1/3203 713/323 |
| 6,845,053 B2 * | 1/2005 | Chevallier | ........... G11C 29/028 365/185.33 |
| 7,091,471 B2 * | 8/2006 | Wenstrand | ............ G06F 1/3203 250/221 |
| 7,650,481 B2 * | 1/2010 | Walker | ............... G06F 13/1689 365/193 |

(Continued)

FOREIGN PATENT DOCUMENTS

| JP | 2005-267163 | 9/2005 |
| KR | 1020100095938 | 9/2010 |

(Continued)

OTHER PUBLICATIONS

Power Management from Linux Kernel to Android, National Taiwan University, May 17, 2010.*

(Continued)

*Primary Examiner* — Adam M Queller
*Assistant Examiner* — Edmund H Kwong
(74) *Attorney, Agent, or Firm* — F. Chau & Associates, LLC

(57) ABSTRACT

An access method of a nonvolatile memory device included in a user device includes receiving a write request to write data into the nonvolatile memory device; detecting an application issuing the write request, a user context, a queue size of a write buffer, an attribute of the write-requested data, or an operation mode of the user device; and deciding one of a plurality of write modes to use for writing the write-requested data into the nonvolatile memory device according to the detected information. The write modes have different program voltages and verify voltage sets.

17 Claims, 22 Drawing Sheets

(56) References Cited

U.S. PATENT DOCUMENTS

| | | | |
|---|---|---|---|
| 7,877,569 B2 | 1/2011 | Honda | |
| 8,341,331 B2 | 12/2012 | Meir | |
| 8,554,983 B2 * | 10/2013 | Jeddeloh | G06F 12/0246 711/103 |
| 2007/0064480 A1 * | 3/2007 | Kuo | G11C 16/0475 365/185.03 |
| 2008/0162799 A1 * | 7/2008 | Spry | G06F 13/1642 711/104 |
| 2010/0281489 A1 | 11/2010 | Lee et al. | |
| 2011/0138117 A1 | 6/2011 | Nakamura et al. | |
| 2011/0258372 A1 | 10/2011 | Toyama et al. | |
| 2012/0254524 A1 | 10/2012 | Fujimoto | |
| 2012/0317346 A1 | 12/2012 | Yeh | |
| 2014/0369124 A1 | 12/2014 | Moon et al. | |

FOREIGN PATENT DOCUMENTS

| | | |
|---|---|---|
| KR | 1020110096829 | 8/2011 |
| KR | 1020140145063 | 12/2014 |

OTHER PUBLICATIONS

Du et al., Dynamic Voltage Scaling of Flash Memory Storage Systems for Low-Power Real-Time Embedded Systems, Proceedings of the Second International Conference on Embedded Software and Systems, 2005.*

Eric Slack, Why Flash Wears Out and How to Make it Last Longer, Mar. 6, 2012, http://www.storage-switzerland.com/Articles/Entries/2012/3/6_Why_Flash_Wears_Out_and_How_to_Make_it_Last_Longer.html (Year: 2012).*

* cited by examiner

| | | 216a |
|---|---|---|
| Average EC | | |
| Average CEW | | 216b |

216c

| BLK | EC | last EW | CEW | Write Mode | Read Enhanced Write Mode |
|---|---|---|---|---|---|
| BLK0 | 150 | 0.8 | 120.5 | WM0 | -- |
| BLK1 | 3200 | 0.9 | 2900.6 | WM1 | -- |
| BLK2 | 500 | 1 | 485.7 | -- | -- |
| BLK3 | 300 | 0.5 | 186 | -- | REWM2 |
| ⋮ | ⋮ | ⋮ | ⋮ | ⋮ | ⋮ |
| BLKn-1 | 2500 | 0.6 | 1822.8 | WM2 | -- |

Fig. 19

| WMi | Default | Description | |
|---|---|---|---|
| WM0 | WM0 | Normal Mode | Default speed |
| WM1 | | Slow mode-1 | 75% of Normal speed |
| WM2 | | Slow mode-2 | 50% of Normal speed |
| WM3 | | Slow mode-3 | 25% of Normal speed |
| WM4 | | Slow mode-4 | 10% of Normal speed |
| WM5 | | Slow mode-5 | 5% of Normal speed |
| WM6 | | Fast mode-1 | 125% of Normal speed |
| WM7 | | Fast mode-2 | 150% of Normal speed |

Fig. 20

| RMi | Default | Description | |
|---|---|---|---|
| RM0 | RM0 | Normal Mode | Default speed |
| RM1 | | Slow mode-1 | 75% of Normal speed |
| RM2 | | Slow mode-2 | 50% of Normal speed |
| RM3 | | Slow mode-3 | 25% of Normal speed |
| RM4 | | Slow mode-4 | 10% of Normal speed |
| RM5 | | Slow mode-5 | 5% of Normal speed |
| RM6 | | Fast mode-1 | 125% of Normal speed |
| RM7 | | Fast mode-2 | 150% of Normal speed |

USER DEVICE INCLUDING A NONVOLATILE MEMORY DEVICE AND A DATA WRITE METHOD THEREOF

CROSS-REFERENCE TO RELATED APPLICATION

This U.S. non-provisional patent application claims priority under 35 U.S.C. § 119 to Korean Patent Application No. 10-2013-0067228, filed on Jun. 12, 2013, the disclosure of which is incorporated by reference herein in its entirety.

TECHNICAL FIELD

Exemplary embodiments of the inventive concept relate to semiconductor memory devices and, more particularly, to a user device including a nonvolatile memory device and a data write method thereof.

DISCUSSION OF THE RELATED ART

Semiconductor memory devices may be classified as volatile memory devices or nonvolatile memory devices. Volatile memory devices typically have a high read speed and a high write speed, but require power to maintain their stored data. Nonvolatile memory devices can maintain their stored data even when not powered. Accordingly, the nonvolatile memory devices are typically used to store data that should be preserved in the absence of power.

An example of a nonvolatile memory device is a flash memory device. Flash memory devices have been used as audio and video data storage media of information appliances such as computers, cell phones, smartphones, personal digital assistants (PDAs), camcorders, voice recorders, MP3 players, handheld personal computers (PCs), game consoles, facsimiles, scanners, printers, and so on. Technologies for high capacity, high-speed input/output, and low power consuming nonvolatile memory devices are under research and development.

SUMMARY OF THE INVENTION

An exemplary embodiment of the inventive concept provides an access method of a nonvolatile memory device included in a user device. The access method may include receiving a write request to write data into the non-volatile memory device; detecting an application issuing the write request, a user context, a queue size of a write buffer, an attribute of the write-requested data, or an operation mode of the user device; and deciding one of a plurality of write modes to use for writing the write-requested data into the nonvolatile memory device according to the detected information. The write modes have different program voltages and verify voltage sets.

The write mode to use for writing the write-requested data is decided according to a kind of the application issuing the write request.

The user context includes a time interval between a time of the write request and a time of an input to a user interface or between the time of the write request and a time of an ON/OFF state of a display.

When the display is in the OFF state and a reference time is elapsed from a time point when the display is turned off, a write mode with a lowest write speed or highest data integrity is decided as the write mode to use for writing the write-requested data.

The user context includes information on whether a user's eye gazes at a display.

A write mode with a lowest write speed is decided to be used for writing the write-requested data when the queue size of the write buffer storing the write-requested data is less than a minimum reference value.

A write mode with a highest write speed is decided to be used for writing the write-requested data when the queue size of the write buffer storing the write-requested data exceeds a maximum reference value.

The queue size of the write buffer corresponds to the amount of write data accumulated in a synchronous queue.

An operation mode of the user device includes a screen save mode, a lock mode, or a power saving mode.

A lifetime of the nonvolatile memory device or a total amount of data written into the nonvolatile memory device is detected in the deciding operation.

An exemplary embodiment of the inventive concept provides a user device including a display, a user interface, and a write buffer. The user device may include a memory system configured to vary an access bias to a nonvolatile memory device depending on a write mode; and a host configured to decide the write mode for write-requested data according to a kind of application being executed, a time of user input to the user interface, an ON/OFF state of the display, a queue size of data stored in the write buffer, an attribute of the write-requested data, an operation mode of the user device, a lifetime of the memory system or a total amount of data written into the nonvolatile memory device.

The host includes a write mode manager configured to decide the write mode for the write-requested data.

The write mode manager is a software module driven in a platform layer of the host.

The write mode manager is a software module driven in a file system or device driver layer of the host.

The user device further includes a write queue monitor configured to detect a queue size of the write buffer and provide information on the queue size to the write mode manager.

An exemplary embodiment of the inventive concept provides an access method of a device including a host and a memory system, the method including: receiving, at the host, a first write mode set signal from an application of the host, a second write mode set signal from a user context monitor of the host and a third write mode set signal from a write queue monitor of the host; determining, at the host, a write mode based on one or a combination of the first to third write mode set signals; and providing the write mode to the memory system.

The application is a software application.

The user context monitor is responsive to input from a user interface or display.

The write queue monitor is responsive to a write buffer included in an input/output scheduler.

The memory system includes a flash translation layer.

BRIEF DESCRIPTION OF THE DRAWINGS

The above and other features of the inventive concept will become more apparent by describing in detail exemplary embodiments thereof with reference to the attached drawings. In the drawings, like reference numerals may refer to the same or similar elements. The drawings are not necessarily to scale.

FIG. 8 is a table showing a per-block mode table in FIG. 4, according to an exemplary embodiment of the inventive concept.

FIG. 19 is a table showing write modes of present application according to an exemplary embodiment of the inventive concept.

FIG. 20 is a table showing read modes of present application according to an exemplary embodiment of the inventive concept.

DETAILED DESCRIPTION OF THE EMBODIMENTS

Hereinafter, exemplary embodiments of the inventive concept will be described with reference to the accompanying drawings. However, this inventive concept should not be construed as limited to the embodiments set forth herein.

Below, a NAND flash memory device is used as an example for illustrating characteristics and functions of the inventive concept. However, other memory devices can be used in accordance with exemplary embodiments of the inventive concept. For example, phase-change random access memory (PRAM), magnetoresistive random access memory (MRAM), resistive random access memory (Re-RAM), ferroelectric random access memory (FRAM), and/or NOR flash memories may be used.

Figure 1:
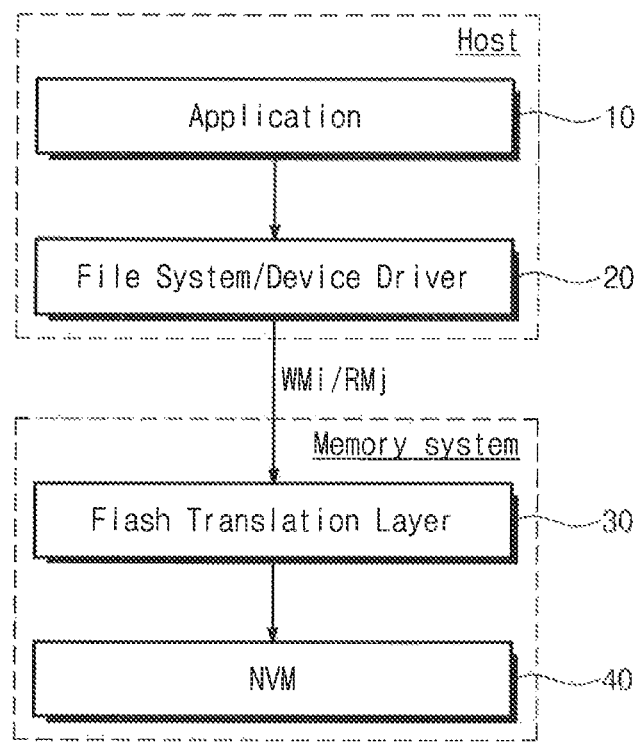
FIG. 1 is a block diagram illustrating a layer structure of software for driving a nonvolatile memory device according to an exemplary embodiment of the inventive concept.

FIG. 1 is a block diagram illustrating a layer structure of software for driving a nonvolatile memory device according to an exemplary embodiment of the inventive concept. In a software layer of a user device (e.g., mobile device) according to an exemplary embodiment of the inventive concept, a write mode WMi or a read mode RMj is provided from a host side to a memory system side.

Referring to FIG. 1, application software 10 and a file system/device driver 20 are software driven at the host side. In particular, the application software 10 or software associated with a user interface or an operating system (OS) will hereinafter be referred to as a "platform". A write mode or a read mode based on a situation of the host may be decided by upper layer software of the host. In an exemplary embodiment of the inventive concept, the write mode WMi or the read mode RMj for the nonvolatile memory device 40 may be decided by lower layer software of the host such as the file system/device driver 20.

The write mode WMi or the read mode RMj corresponds to a program mode considering write speed or integrity of data to be written into the nonvolatile memory device 40 or retention characteristics of the data. For example, a write bias for providing improved integrity of data when the data is written into the nonvolatile memory device 40 may be referred to as one write mode. Alternatively, a write bias for improving a data program speed may be referred to as another write mode. An example of the write mode WMi will be explained in detail later with reference to accompanying drawings. Additionally, a read bias for providing improved integrity or read speed of data when data is read from the nonvolatile memory device 40 may be referred to as one read mode.

A flash translation layer 30 provides interfacing to conceal an erase operation of the nonvolatile memory device 40 between the host and the nonvolatile memory device 40. Aspects of the nonvolatile memory device 40, such as erase-before-write and a mismatch between erase and write units, may be complemented by the flash translation layer 30. In addition, the flash translation layer 30 maps a logical address LA generated by the host onto a physical address PA of the nonvolatile memory device 40 during a write operation of the nonvolatile memory device 40.

The flash translation layer 30 may establish an address mapping table to map a physical address PA of the nonvolatile memory device 40 to a corresponding logical address LA. Various address mapping methods, which depend on mapping units, may be used by the flash translation layer 30. Exemplary address mapping methods include a page mapping method, a block mapping method, a hybrid mapping method and the like.

The flash translation layer 30 may control the nonvolatile memory device 40 according to various erase and write modes based on a request of the host or its decision algorithm. For example, the flash translation layer 30 may control the nonvolatile memory device 40 to erase a selected memory block according to one of various erase conditions.

In other words, the flash translation layer 30 may vary the level of an erase voltage applied during an erase operation of the nonvolatile memory device 40. A conventional erase operation is performed under the same condition with respect to all memory blocks. According to a conventional technique for extending lifetime, the nonvolatile memory device 40 is accessed by applying wear leveling based on an erase count.

The flash translation layer 30 applies effective wearing EW of a relatively low value to a memory block managed by a relatively low erase voltage. Thus, wear leveling may not be performed by an erase count uniformly applied, but may be performed based on the degree of substantial exposure to a stress. The flash translation layer 30 may manage a write mode and a read mode according to an erase mode applied to respective memory blocks. In other words, the flash translation layer 30 may generate a command CMD or a mode setup signal to set up a bias for a selected memory block according to the write mode WMi or the read mode RMj provided from the host.

The nonvolatile memory device 40 may vary various driving conditions according to an access mode decided by the flash translation layer 30. A read voltage, an erase voltage, a program voltage, and the like may be selectively generated such that the nonvolatile memory device 40 performs the access mode selected by the flash translation layer 30. For this reason, the nonvolatile memory device 40 may further include an interface to receive a separate command or control signal for the mode setup. The nonvolatile memory device 40 may include elements to adjust a direct current (DC) voltage in response to the received mode setup command or control signal.

The user device's read and write access performance should be very high to satisfy the performance required from many applications which are executed in parallels. But, maximum operation speed is not needed always. If the host can give a speed information such as the write mode WMi or read mode RMj to indicate how much performance is needed to the storage device, the storage device could utilize the speed information to reduce the power consumption or to increase the device lifetime by using lower erase start voltage for erasing operation and lower ISPP voltage for program operation, or increase the system throughput by preparing free block or read reclaiming in advance and so on.

In other words, the host may indicate the storage device which slower access mode is acceptable by setting the write mode WMi or read mode RMj. Depending on those set values the storage device can operate in lower access speed mode, and in this slower mode device may execute it's internal works mentioned above. And when a new access requests are received from the host during the slower access mode, such requests can be delayed until those internal works has been completed depending on the storage device implementation.

One of useful situation for utilizing this feature could be when display screen of the smart phone was off. When owner of smart phone sleeps during the night, requests to the storage device by background Applications are usually not urgent. In such case, the host may set slower access mode by configure the write mode WMi or read mode RMj, and the storage device can be operated more efficient way internally, for example, by relaxing the response time to the host and instead performing the device internal works in parallel for improving the throughput and so on.

Figure 2:
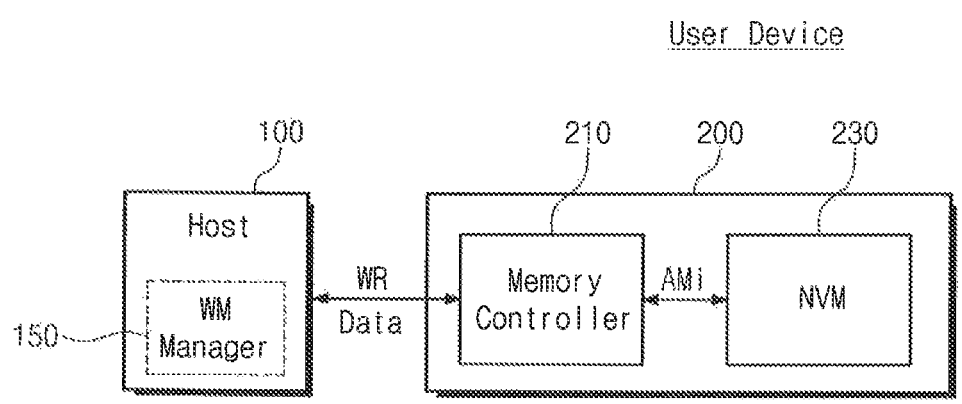
FIG. 2 is a block diagram of a user device according to an exemplary embodiment of the inventive concept.

FIG. 2 is a block diagram of a user device according to an exemplary embodiment of the inventive concept. As illustrated, the user device includes a host 100 and a memory system 200. The memory system may include a memory controller 210 and a nonvolatile memory device 230.

When a write request WR occurs, the host 100 may determine a write mode WMi for the write request WR. The host 100 includes a write mode manager 150 to decide the write mode WMi. The write mode manager 150 may decide a write mode WMi depending on an attribute of write-requested data, a kind of application software issuing a write request, a user input, and a state of the host 100 such as a queue size of a write buffer.

The write mode manager 150 may be provided as hardware including any one of control units of the host 100. The write mode manager 150 may be provided as at least one software module incorporated in an application, an OS, a file system or a device driver. The host 100 may include, for example, a personal/handheld computer, a handheld electronic device such as a personal digital assistant (PDA), a portable multimedia player (PMP), and an MP3 player, a high definition television (HDTV), and the like.

The memory controller 210 interfaces the host 100 with the nonvolatile memory device 230. The memory controller 210 writes data provided from the host 100 into the nonvolatile memory device 230 in response to a write command of the host 100. The memory controller 210 controls a read operation of the nonvolatile memory device 230 in response to a read command from the host 100.

The memory controller 210 may variously set up an operation bias for a selected memory area in response to the write mode WMi provided from the host 100. The memory controller 210 may provide an access mode AMi for setting up an operation bias of the nonvolatile memory device 230 through a command or a control signal.

The memory controller 210 may maintain erase mode information on respective memory blocks of the nonvolatile memory device 230. The memory controller 210 decides the access mode AMi with reference to an erase mode EM of a memory block corresponding to a logical address LA when a write request WR and a write mode WMi are input from the host 100. For example, the memory controller 210 may control a write mode WMi for a memory block using a relatively low erase voltage and a relatively high erase verify voltage at a low speed during an erase operation. In addition, the memory controller 210 may control a write mode WMi for a memory block using a relatively high erase voltage and a relatively low erase verify voltage at a high speed during an erase operation. In addition, the memory controller 210 may first erase a selected memory area (e.g., memory block, superblock, chip, etc.) for a write operation.

The memory controller 210 may decide or adjust read and write modes according to effective wearings EW of all memory blocks. The memory controller 210 may perform wear leveling or garbage collection based on cumulative effective wearing. Although selection of the access mode AMi for a selected memory block has been explained herein, the inventive concept is not limited to the above explanation. In other words, the memory controller 210 may select a physical address of a memory block, which may be accessed according to the access mode AMi, depending on its use. In the situation where data is written at a high speed, the memory controller 210 may map a physical address of an erase-state memory block, which may be programmed at a high speed, onto a logical address.

The memory controller 210 may decide an access mode AMi including a write mode, a read mode, and an erase mode with reference to the number of free blocks, a size of write-requested data, a time interval between requests, and so on. These operations will be described in detail later.

The nonvolatile memory device 230 is provided as a storage medium of a memory system. For example, the nonvolatile memory device 230 may include a NAND-type flash memory having a large storage capacity. Alternatively, the nonvolatile memory device 230 may include next-generation nonvolatile memories such as PRAM, MRAM, ReRAM, and FRAM or a NOR-type flash memory. In particular, the nonvolatile memory device 230 may adjust the level of a bias such as a DC voltage in response to a command or control signal corresponding to the access mode AMi provided from the memory controller 210.

In the above-described user device according to an exemplary embodiment of the inventive concept, a write mode WMi of write-requested data is decided according to the situation of the host 100. The decided write mode WMi may be provided to the side of the memory system 200 simultaneously with a write request or through a separate command. The memory system 200 includes a nonvolatile memory device 230 where the level of an erase voltage and a threshold voltage in an erase state may be variously set up. The memory controller 210 may assign different effective wearings EW according to the level of an erase voltage applied to respective memory blocks and a stress received during an erase operation. The memory controller 210 may manage a memory with reference to cumulative effective wearing CEW for respective memory blocks. When a write mode is set up by the host 100, a state of a user or an input/output system or a user device may be applied more effectively to manage memory. Thus, lifetime of the memory system 200 may be extended while minimizing performance degradation that the user experiences.

Figure 3:
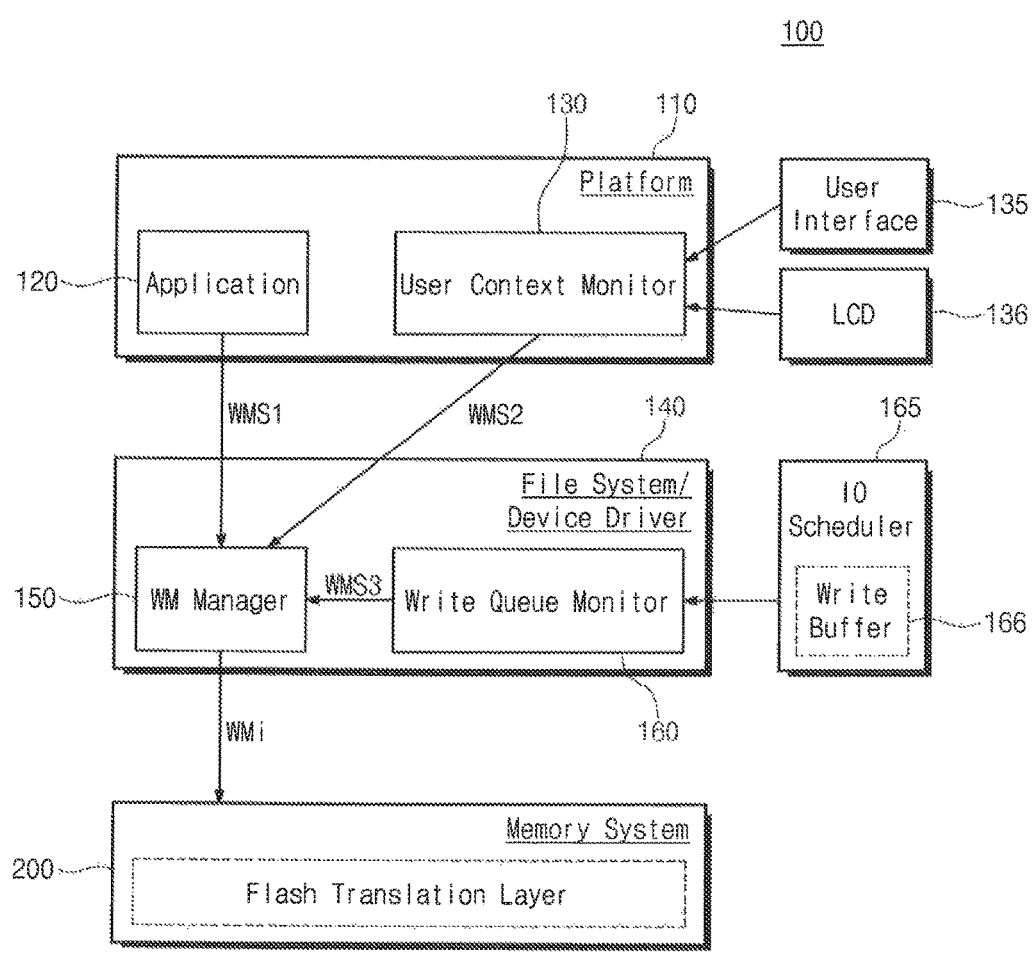
FIG. 3 is a block diagram of a hardware structure of a host in FIG. 2, according to an exemplary embodiment of the inventive concept.

FIG. 3 is a block diagram of a hardware structure of the host 100 in FIG. 2, according to an exemplary embodiment of the inventive concept. Referring to FIG. 3, software of the host 100 may include a platform 110 and a file system/device driver 140. A write mode manager 150 may be included in the file system/device driver 140 as a function module.

The platform 110 includes application software 120 and a user context monitor 130. The platform 110 is the common name of an OS of a user device or application software 120 driven on the OS and basic software for various services. According to an exemplary embodiment of the inventive concept, a first write mode set signal WMS1 may be decided by the application software 120 that is currently driven on the platform 110.

The user context monitor 130 may monitor whether there is a user input of a user interface 135 or monitor a period of the user input. The user context monitor 130 may monitor an ON/OFF state of a liquid crystal display (LCD) 136. Although an LCD is shown other displays may be used with the inventive concept such as an organic light emitting diode display. The user context monitor 130 may generate a second write mode set signal WMS2 with reference to the state of the user interface 135 or the LCD 136. The first write mode set signal WMS1 and the second write mode set signal WMS2 may be independently generated. These signals WMS1 and WMS2 are collected by the write mode manager 150.

The file system/device driver 140 may include the write mode manager 150 and a write queue monitor 160. The write queue monitor 160 monitors a state of a write buffer 166 managed by an input/output scheduler 165. In other words, the write queue monitor 160 may monitor a queue size of data accumulated on the write buffer 166 to generate a third write mode set signal WMS3. The third write mode set signal WMS3 may be provided to the write mode manager 150 to act as a reference for mode decision.

The write mode manager 150 transfers a write mode WMi to the memory system 200 with reference to the first to third write mode set signals WMS1~WMS3. The write mode WMi may be decided by the respective first to third write mode set signals WMS1~WMS3 or through a combination of the first to third write mode set signals WMS1~WMS3.

A flash translation layer (FTL) of the memory system 200 accesses a selected memory area according to the provided write mode WMi. In other words, the FTL may write data into a selected memory block or write data into a selected memory block after the selected memory block is erased according to a specific erase mode.

Heretofore, a software structure of the host 100 according to an exemplary embodiment of the inventive concept has been described. However, a position on a software layer of the write mode manager 150 is not limited to the example shown.

Figure 4:
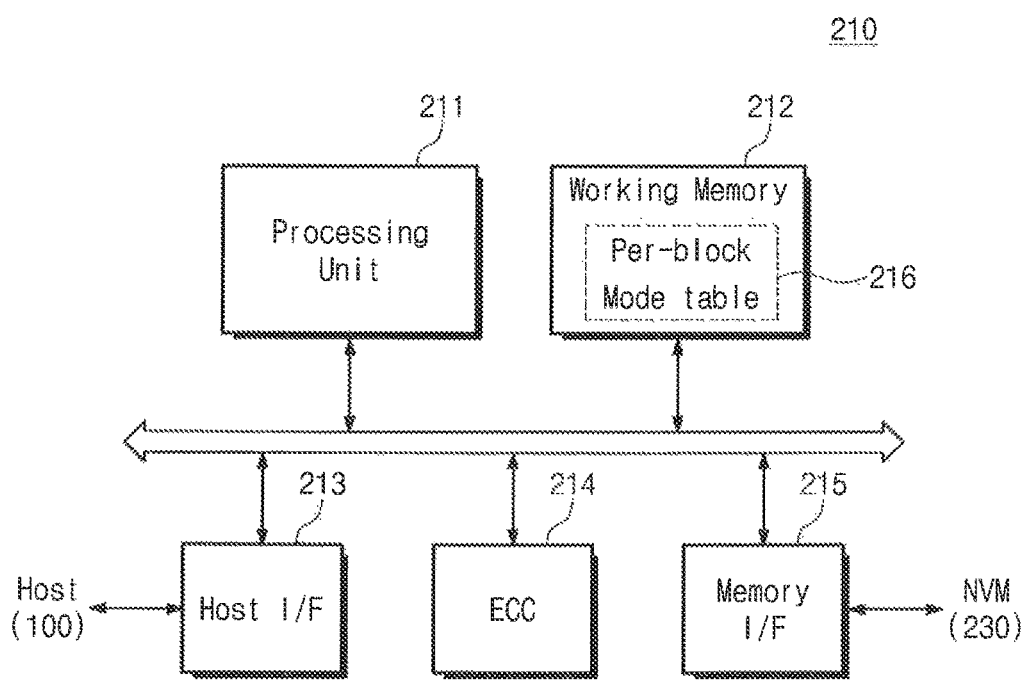
FIG. 4 is a block diagram illustrating hardware elements of a memory controller in FIG. 2, according to an exemplary embodiment of the inventive concept.

FIG. 4 is a block diagram illustrating hardware elements of the memory controller 210 in FIG. 2, according to an exemplary embodiment of the inventive concept. As illustrated, the memory controller 210 includes a processing unit 211, a working memory 212, a host interface 213, an error correction unit (ECC) 214, and a memory interface 215. However, it will be understood that elements of the memory controller 210 are not limited to the above elements. For example, the memory controller 210 may further include a read only memory (ROM) configured to store code data required for initial booting.

The processing unit 211 includes a central processing unit (CPU) or a microprocessor. The processing unit 211 controls the overall operation of the memory controller 210. The processing unit 211 is configured to drive firmware for controlling the memory controller 210. The firmware is loaded on the working memory 212 to be driven.

Software (or firmware) and data are loaded on the working memory 212 to control the memory controller 210. Stored software or data is driven or processed by the processing unit 211. According to an exemplary embodiment of the inventive concept, an FTL (not shown in FIG. 4) and a per-block mode table 216 may be loaded on the working memory 212. Information on effective wearing EW, cumulative effective wearing CEW, a write mode WMi or the like for respective memory blocks may be stored and maintained in the per-block mode table 216.

The host interface 213 provides an interface between the host 100 and the memory controller 210. The host 100 and the memory controller 210 may be connected through one of various interfaces. Alternatively, the host 100 and the memory controller 210 may be connected through a plurality of various interfaces. The interfaces include advanced technology attachment (ATA), serial-ATA (SATA), external SATA (e-SATA), small computer system interface (SCSI), serial attached SCSI (SAS), peripheral component interconnection (PCI), PCI express (PCI-E), universal serial bus (USB), IEEE 1394, and card interface, for example. The ECC 214 may correct an error of data corrupted by various causes. For example, the ECC 214 may perform an operation to detect and correct an error of data read from the nonvolatile memory device 230.

The memory interface 215 provides an interface between the memory controller 210 and the nonvolatile memory device 230. For example, data processed by the processing unit 211 is stored in the nonvolatile memory device 230 through the memory interface 215. As another example, data stored in the nonvolatile memory device 230 is provided to the processing unit 211 through the memory interface 215. The memory interface 215 may perform a setup operation on the nonvolatile memory device 230 for executing a decided access mode AMi. A bias of the nonvolatile memory device 230 may be set up through a command or a control signal.

Figure 5:
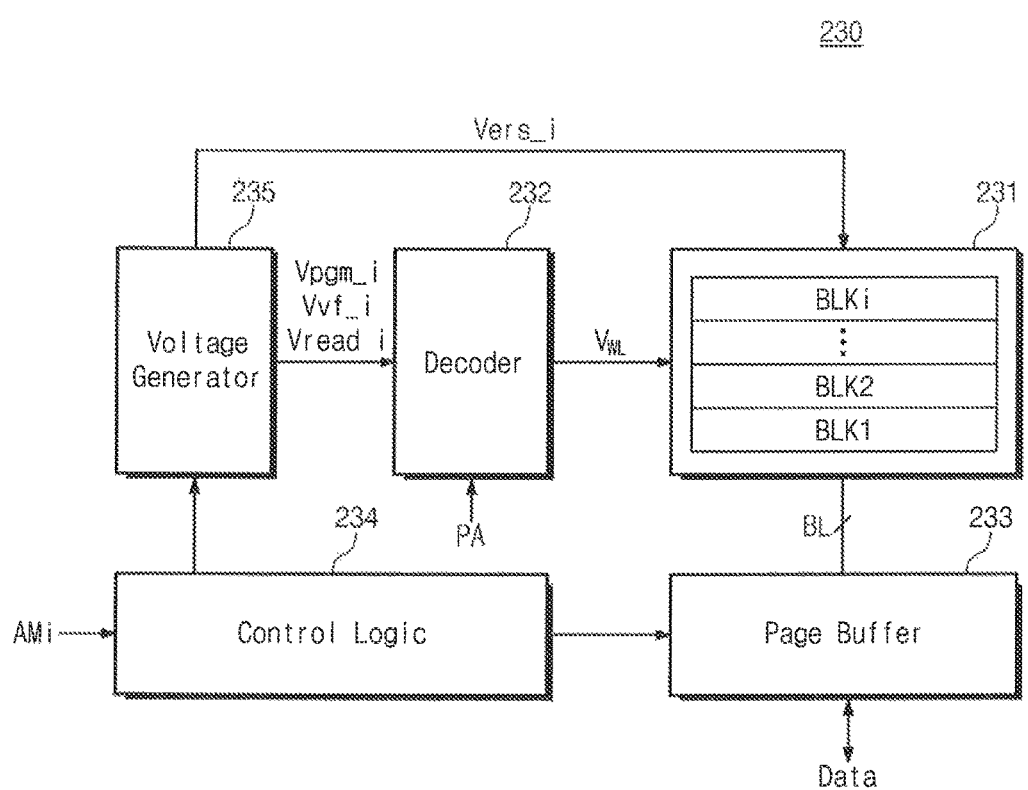
FIG. 5 is a block diagram of a nonvolatile memory device according to an exemplary embodiment of the inventive concept.

FIG. 5 is a block diagram of a nonvolatile memory device 230 according to an exemplary embodiment of the inventive concept. As illustrated, the nonvolatile memory device 230 includes a cell array 231, a decoder 232, a page buffer 233, a control logic 234, and a voltage generator 235.

The cell array 231 is connected to the decoder 232 through wordlines WLs or selection lines SSL (e.g., string selection lines) and GSL (e.g., ground selection lines). The cell array 231 is connected to the page buffer 233 through bitlines BLs. The cell array 231 includes a plurality of memory blocks BLK1~BLKz. Each of the memory blocks BLK1~BLKz includes a plurality of NAND cell strings. An erase operation is performed units of the memory blocks BLK1~BLKz. During the erase operation, an erase voltage Vers_i (with i varying depending on a mode) generated by the voltage generator 235 is supplied to a selected memory block of the cell array 231. After the erase voltage Vers_i is supplied, an erase verify voltage Vevf_i may be supplied to wordlines of the memory block.

The erase voltage Vers_i may vary depending on an erase mode EMi. For example, a level of the erase voltage Vers_i may be lowered in an erase mode where a threshold voltage of memory cells corresponding to an erase state is relatively high. Alternatively, when the erase voltage Ver_i is provided in the form of an incremental step pulse, an erase start voltage may be relatively low. A level of the erase verify voltage Vevf_i may be decided depending on the erase mode EMi.

The decoder 232 may select any one of the memory blocks BLK1~BLKz of the cell array 231 in response to an address PA. The decoder 232 may provide a wordline voltage $V_{WL}$ corresponding to an operation mode to a wordline of the selected memory block. For example, during a program operation, the decoder 232 transfers a program voltage Vpgm_i and a verify voltage Vvf_i to a selected wordline and transfers a pass voltage Vpass to an unselected wordline. The decoder 232 may provide a selection signal to the selection lines SSL and GSL to select a memory block, a sub-block or the like. During a read operation, a read voltage Vrd_i is supplied to a selected wordline of a memory block. During the read operation, a pass read voltage Vreadi may be supplied to unselected wordlines of the memory block.

The page buffer 233 acts as a write driver or a sense amplifier according to an operation mode. During a program operation, the page buffer 233 transfers a bitline voltage corresponding to data to be programmed to a bitline of the cell array 231. During a read operation, the page buffer 233 senses data stored in a selected memory cell through a bitline. The page buffer 233 latches the sensed data and transfers the latched data to an external entity.

The control logic 234 controls the page buffer 233 and the decoder 232 in response to an externally transmitted command CMD. In particular, the control logic 234 may control the page buffer 233 and the voltage generator 235 to perform an access operation on a selected memory block according to an externally provided access mode AMi. For example, the control logic 234 may control the voltage generator 235 to generate a program voltage and a verify voltage to be provided to a selected memory block according to a write mode WMi. The control logic 234 may control the voltage generator 235 to generate various sets of read and pass voltages Vrd_i and Vreadi according to a read mode.

The voltage generator 235 generates various kinds of wordline voltages to be supplied to respective wordlines and a voltage to be supplied to a bulk (e.g., well region) where memory cells are formed, according to the control of the control logic 234. The wordline voltages to be supplied to the respective wordlines include a program voltage Vpgm_i, a pass voltage Vpass, a read voltage Vrd_i, a pass read voltage Vreadi, and the like. The voltage generator 235 may generate selection line voltages $V_{SSL}$ and $V_{GSL}$ supplied to the selection lines SSL and GSL during the read and program operations.

In particular, the voltage generator 235 may generate an erase voltage Vers_i with various levels. The voltage generator 235 may adjust a start pulse level of the erase voltage Vers_i to be supplied to a bulk region of a selected memory block to various values according to the erase mode EMi. In addition, the voltage generator 235 may generate an erase verify voltage Vevf_i of a level corresponding to the erase voltage Vers_i. The voltage generator 235 may generate the overall DC voltage corresponding to various access modes AMi such as read, write, and erase modes.

The nonvolatile memory device 230 according to an exemplary embodiment of the inventive concept may vary erase, write, and read biases for a selected memory block in response to an access mode AMi provided by the memory controller 210. Thus, an erase voltage stress applied to a memory block of the nonvolatile memory device 230 may be minimized. As the erase voltage stress is alleviated, the lifetime of the nonvolatile memory device 230 may be extended.

Figure 6:
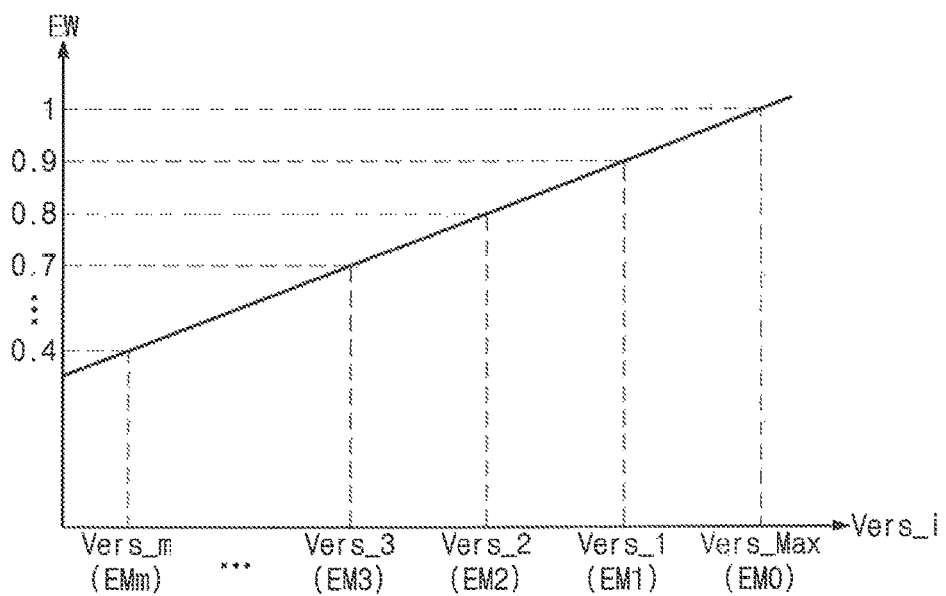
FIG. 6 is a graph showing effective wearing according to an exemplary embodiment of the inventive concept.

FIG. 6 is a graph showing effective wearing EW according to an exemplary embodiment of the inventive concept. In FIG. 6, a level of effective wearing EW based on an erase voltage Vers_i is shown as a linear function.

When a memory block is erased by a maximum erase voltage Vers_Max, a size of the effective wearing EW may be decided to be "1". When the memory block is erased by a lowest erase voltage Vers_m, the effective wearing EW of the memory block may be set to "0.4". Effective wearing EW of a memory block erased by the erase voltage Vers_1 may be mapped to "0.9". The setting of the effective wearing EW is merely exemplary. It will be understood that a corresponding relationship between the erase voltage Vers_i and corresponding effective wearing EW may be variously set using test values.

In addition, a corresponding relationship between the erase voltage Vers_i and effective wearing EW may be set not in the form of a linear function but in the form of a parabolic function, an exponential function or a logarithmic function. The erase voltage Vers_i may be an erase start voltage applied to a bulk region of a memory block during each erase operation. However, it will be understood that the definition of the erase voltage Vers_i is not limited to the above.

Figure 7:
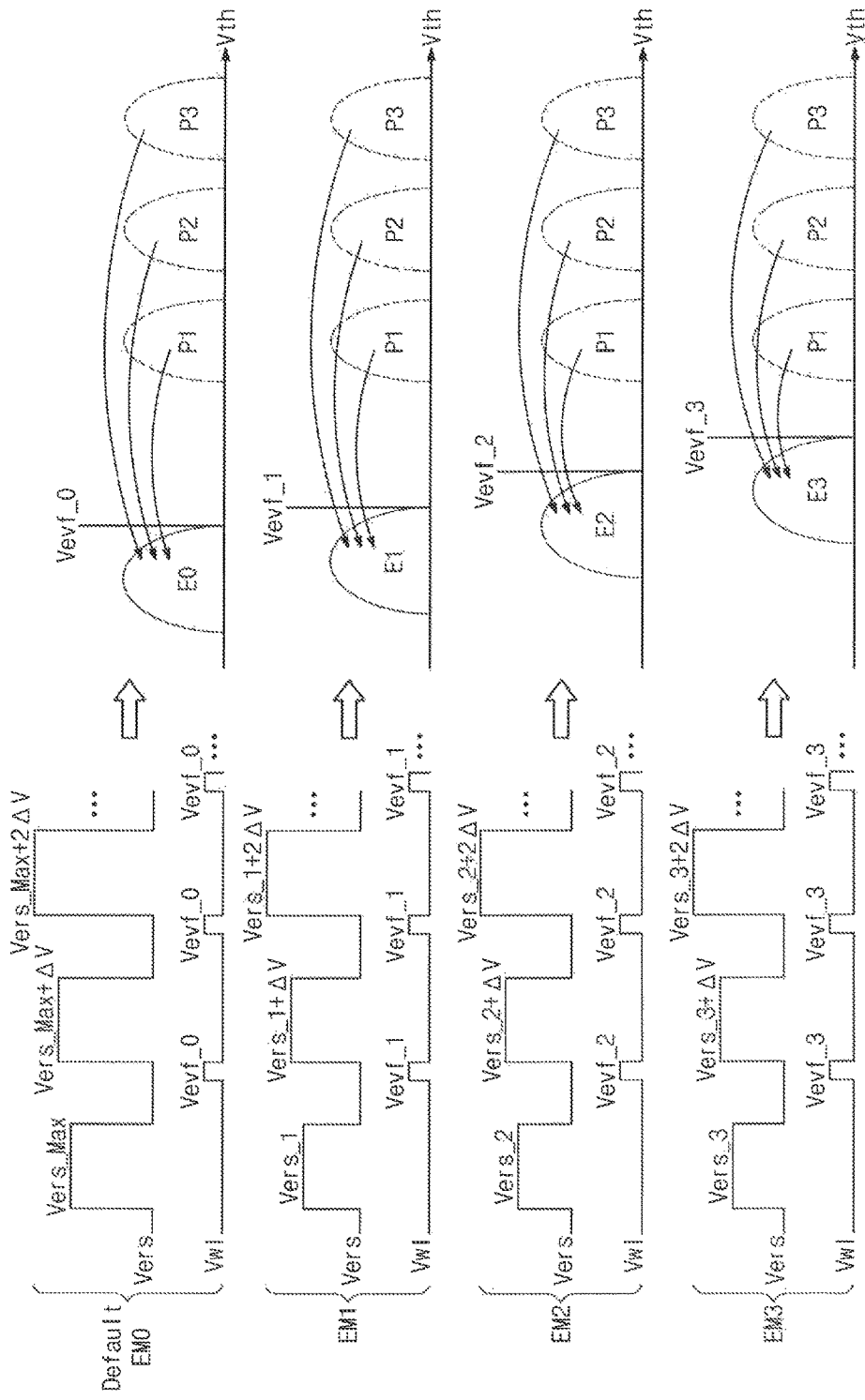
FIG. 7 illustrates an erase mode according to an exemplary embodiment of the inventive concept.

FIG. 7 illustrates an erase mode EMi according to an exemplary embodiment of the inventive concept. Referring to FIG. 7, an erase mode EMi may be divided depending on a level of an erase voltage Vers_i or a level of an erase verify voltage Vevf_i.

First, a default erase mode EM0 will now be described. When there is no assignment to an erase mode, a selected memory block may be erased according to the default erase mode EM0. Alternatively, when a selected memory block is set to be erased according to the default erase mode EM0, the selected memory block may be erased based on an erase start voltage Vers_Max and an erase verify voltage Vevf_0.

When a memory block is erased according to an incremental step pulse scheme, the erase start voltage Vers_Max may be supplied to a bulk region of a selected memory block. Then, the erase verify voltage Vevf_0 may be supplied to wordlines of the selected memory block. When there are memory cells whose threshold voltage is made higher than the erase verify voltage Vevf_0 by an erase verify operation, an erase operation based on an erase voltage Vers_Max+ΔV and the erase verify voltage Vevf_0 is followed. A further erase operation based on an erase voltage Vers_Max+2ΔV and the erase verify voltage Vevf_0 may follow. When an erase voltage gradually increases in level and a threshold voltage of all memory cells is made lower than the erase verify voltage Vevf_0, the erasure is determined to be completed.

A threshold voltage of memory cells of a memory block selected by an erase operation corresponding to the default erase mode EM0 is shifted to a level corresponding to an erase state E0. As the default erase mode EM0 is executed, a threshold voltage of memory cells in the erase state E0 and program states P1, P2, and P3 may be made lower than the erase verify voltage Vvef_0.

Next, a first erase mode EMI will now be described. When a selected memory block is decided to be erased according to the first erase mode EMI, the erase memory block is erased based on an erase start voltage Vers_1 and an erase verify voltage Vevf_1. An erase start voltage Vers_1 may be supplied to a memory block selected for erasure. An erase verify voltage Vevf_1 may be supplied to wordlines of the selected memory block. When there are memory cells whose threshold voltage is made higher than the erase verify voltage Vevf_1 by an erase verify operation, an erase operation based on an erase voltage Vers_1+ΔV and the erase verify voltage Vevf_is followed. A further erase operation based on an erase voltage Vers_1+2ΔV and the erase verify voltage Vevf_may follow.

When an erase voltage gradually increases in level and a threshold voltage of all memory cells is made lower than the erase verify voltage Vevf_1, the erasure is determined to be completed. A threshold voltage of memory cells of a memory block selected by an erase operation corresponding to the first erase mode EM1 is shifted to a level corresponding to erase state E1. After the first erase mode EMI is executed, the threshold voltage of the memory cells in the erase state E1 and program states P1, P2 and P3 may be made lower than the erase verify voltage Vevf_1.

When a second erase mode EM2 is executed, a selected memory block is erased based on an erase start voltage Vers_2 and an erase verify voltage Vevf_2. The erase start voltage Vers_2 may be supplied to a selected memory block, and the erase verify voltage Vevf_2 may be supplied to wordlines of the selected memory block. When the operation is determined to be incompletely erased, a subsequent erase operation based on an erase voltage Vers_2+ΔV and an erase verify voltage Vevf_2 is followed. A further erase operation based on an erase voltage Vers_2+2ΔV and the erase verify voltage Vevf_2 may follow. When an erase voltage gradually increases in level and a threshold voltage of all memory cells is made lower than the erase verify voltage Vevf_2, the erasure is determined to be completed.

A threshold voltage of memory cells selected by an erase operation corresponding to the second erase mode EM2 is shifted to a level corresponding to an erase state E2. After the second erase mode EM2 is executed, the threshold voltages of the memory cells in the erase state E2 and program states P1, P2 and P3 may be made lower than the erase verify voltage Vevf_2.

When a third erase mode EM3 is executed, a selected memory block is erased based on an erase start voltage Vers_3 and an erase verify voltage Vevf_3. The erase start voltage Vers_3 may be supplied to a selected memory block, and the erase verify voltage Vevf_3 may be supplied to wordlines of the selected memory block. When the operation is determined to be incompletely erased, a subsequent erase operation based on an erase voltage Vers_3+ΔV and an erase verify voltage Vevf_3 is followed. A further erase operation based on an erase voltage Vers_3+2ΔV and the erase verify voltage Vevf_3 may follow. When an erase voltage gradually increases in level and a threshold voltage of all memory cells is made lower than the erase verify voltage Vevf_3, the erasure is determined to be completed.

A threshold voltage of memory cells selected by an erase operation corresponding to a third erase mode EM3 is shifted to a level corresponding to an erase state E3. A threshold voltage of memory cells in the erase state E3 and program states P1, P2 and P3 may be made lower than the erase verify voltage Vevf_3 after execution of the third erase mode EM3.

Heretofore, voltage waveforms and threshold voltage distributions for erase operations of plural erase modes have been described. Although the erase modes include four modes, the number of the erase modes may be set to be greater or smaller than four. Any one of the default mode EM0 to the third erase mode EM3 may be selected on the basis of a size of the cumulative effective wearing CEW. In other words, the default erase mode EM0 may be assigned to a memory block of cumulative effective wearing CEW where oxide deterioration of a memory cell is negligible, and the third erase mode EM3 with relatively less stress may be assigned to a memory block of cumulative effective wearing CEW where oxidation deterioration of a memory cell is significant. In addition, a threshold voltage distribution corresponding to an erase mode is not limited to the above-described distributions.

Voltage width of each of the erase states E0, E1, E2, and E3 is not limited to that described above. Distribution width of erase states may be extended as the level of an erase mode increases. For example, distribution width of the erase state E3 may be made greater than that of the erase states E0, E1, and E2.

FIG. 8 is a table showing the per-block mode table 216 in FIG. 4, according to an exemplary embodiment of the inventive concept. Referring to FIG. 8, the per-block mode table 216 may include an average erase count (Average EC) 216a, an average cumulative effective wearing (Average CEW) 216b, and a per-block state table 216c.

The average erase count 216a provides a reference value for a wear leveling operation. For example, use frequency of a memory block with a relatively great erase count may decrease with reference to the average erase count 216a, and use frequency of a memory block with a relatively small erase count may increase with reference to the average erase count 216a. This operation may be performed at an FTL.

The average cumulative effective wearing 216b is a reference for wear leveling according to an exemplary embodiment of the inventive concept. The average cumulative effective wearing 216b corresponds to an average of cumulative effective wearing CEW of respective memory blocks. The FTL may perform wear leveling with reference to the average cumulative effective wearing 216b. For example, the FTL may assign a low selection priority to a memory block with a relatively greater cumulative effective wearing CEW than the average cumulative effective wearing 216*b*. The FTL may grant a high selection priority to a memory block with a relatively smaller cumulative effective wearing CEW than the average cumulative effective wearing 216*b*. A deviation in the cumulative effective wearing 216*b* between memory blocks may be reduced by the operation of the FTL.

The per-block state table 216*c* stores erase states of all the memory blocks. In other words, the per-block state table 216*c* may store an erase count EC, effective wearing EW, and cumulative effective wearing CEW with respect to each memory block. In addition, the per-block state table 216*c* may store a write mode WM or a read enhanced write mode REWM. The write mode WM may be decided according to the effective wearing EW. Alternatively, it will be understood that the write mode WM may be forcibly set up irrespective of the effective wearing EW.

The per-block mode table 216 may hold and update the above-mentioned information. The per-block mode table 216 may provide state information of a selected memory block according to the request of the FTL.

Figure 9:
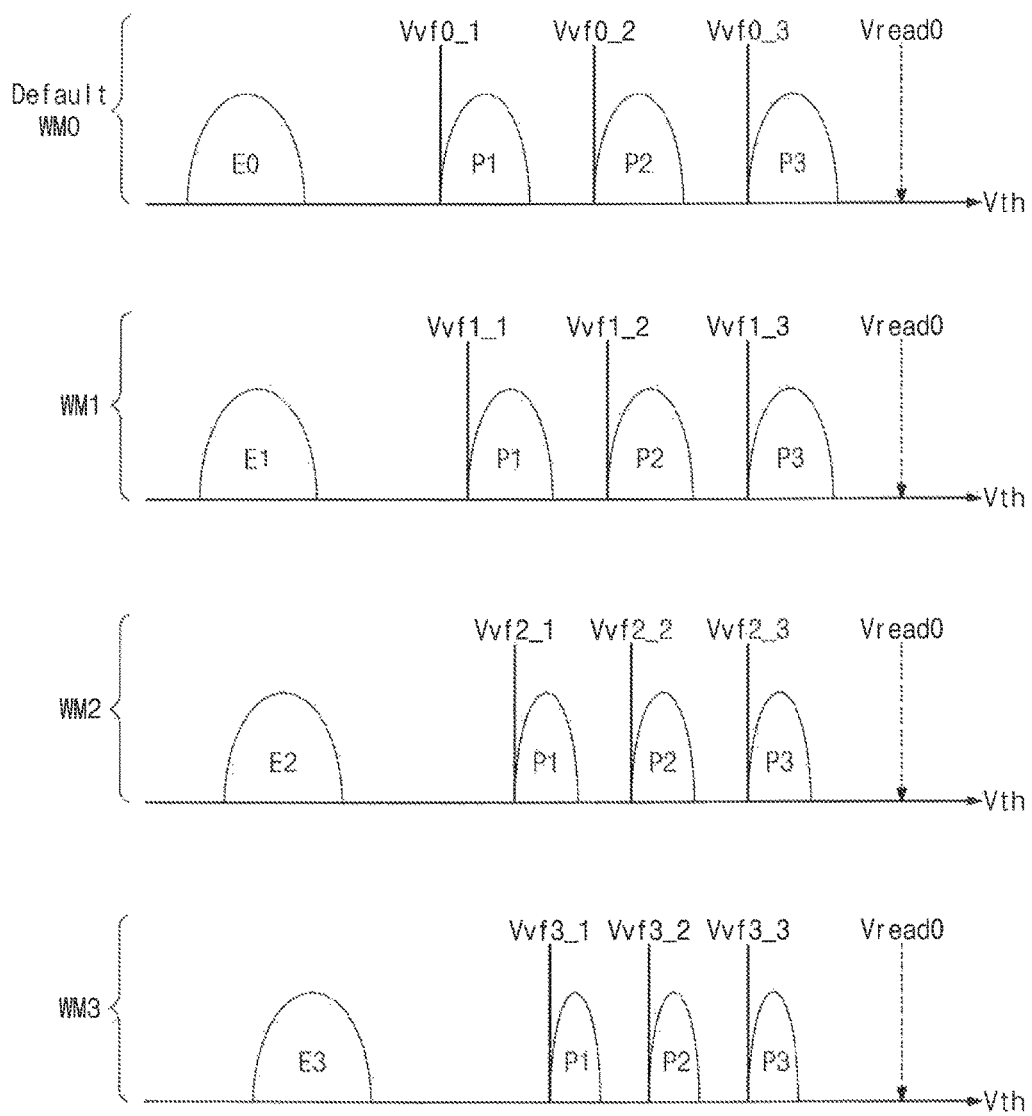
FIG. 9 illustrates write modes according to an exemplary embodiment of the inventive concept.

FIG. 9 illustrates write modes according to an exemplary embodiment of the inventive concept. In FIG. 9, a threshold voltage distribution formed by memory cells selected according to an application of four types of write modes WM0~WM3 is briefly shown. However, it will be understood that a write mode WM may be divided into more than or less than four types. The write mode WM may depend on erase states E0, E1, E2, and E3. However, the write mode WM may be assigned to the host 100 irrespective of an erase state or may be forcibly assigned in an urgent case.

First, a default write mode WM0 will now be described. In the default write mode WM0, a threshold voltage of memory cells may be applied to a memory block corresponding to an erase state E0 by an erase operation. For example, the default write mode WM0 may be applied to a free block prepared by the default write mode WM0. Verify voltage set (Vvf0_1, Vvf0_2, Vvf0_3) may be supplied to memory cells selected for a program operation corresponding to the default write mode WM0. In addition, a level of a program voltage Vpgm for incremental step pulse programming (ISPP) may vary depending on a write mode. For example, an incremental step of a program voltage applied in the default write mode WM0 may be a relatively great value. Thus, write speed in the default write mode WM0 may be higher than that in the other write modes WM1~WM3.

As the first write mode WM1 is applied, a threshold voltage of memory cells may be formed with an erase state E1 and program states P1, P2, and P3. A program voltage Vpgm and verify voltage set (Vvf1_1, Vvf1_2, Vvf1_3) may be supplied to a wordline of memory cells selected for a program operation corresponding to the first write mode WM1. Program speed depending on the first write mode WM1 may be lower than that depending on the default write mode WM0. A memory block erased by the first write mode WM1 may be selected to execute the first write mode WM1.

A threshold voltage of memory cells to which the second write mode WM2 is applied may be formed with an erase state E2 and the program states P1, P2, and P3. A program voltage Vpgm and verify voltage set (Vvf2_1, Vvf2_2, Vvf2_3) may be applied to a wordline of memory cells selected for a program operation corresponding to the second write mode WM2. Program speed depending on the second write mode WM2 may be lower than that depending on the first write mode WM1. A memory block erased by the second write mode WM2 may be selected to execute the second write mode WM2. Accordingly, the speed of programming memory cells from the erase state E2 to the program states P1, P2, and P3 may be improved.

A threshold voltage of memory cells to which the third write mode WM3 is applied may be formed with an erase state E3 and the program states P1, P2, and P3. A program voltage Vpgm and verify voltage set (Vvf3_1, Vvf3_2, Vvf3_3) may be applied to a wordline of memory cells selected for a program operation corresponding to the third write mode WM3. Program speed depending on the third write mode WM3 may be lower than that depending on the second write mode WM2. A memory block erased by the third write mode WM3 may be selected to execute the third write mode WM3.

Heretofore, the write modes WM0~WM3 have been described in brief. The write modes WM0~WM3 may be decided by the erase modes EM0~EM3, respectively. However, although a write mode is set up irrespective of the erase modes EM0~EM3, there is no problem in performing a program operation. Moreover, it will be understood that a level of a verify voltage set corresponding to the respective write modes WM0, WM1, WM, and WM3 is merely exemplary and can vary.

In FIG. 9, Vread0 is a default pass read voltage.

Figure 10:
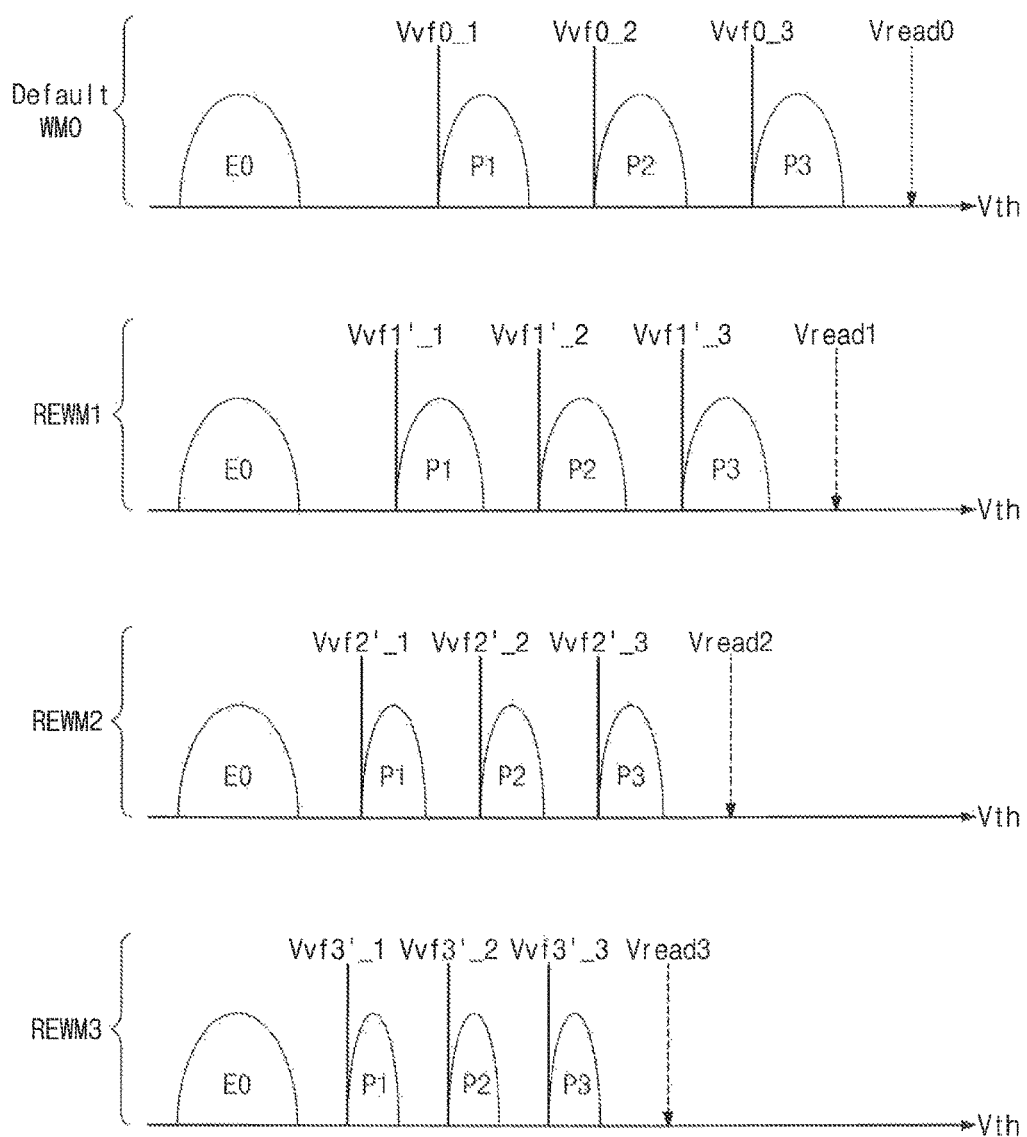
FIG. 10 illustrates a read enhanced write mode according to an exemplary embodiment of the inventive concept.

FIG. 10 illustrates a read enhanced write mode according to an exemplary embodiment of the inventive concept. In FIG. 10, a threshold voltage distribution formed by memory cells selected according to application of a default write mode WM0 and read enhanced write modes REWM1~REWM3 is briefly shown. It will be understood that the number of write modes may be variously changed.

First, a default write mode WM0 will now be described. The default write mode WM0 may be considered to be identical to the default write mode WM0 described in FIG. 9. Therefore, a default pass read voltage Vread0 is applied to read memory cells programmed by the default write mode WM0. The pass read voltage Vread0 corresponds to a highest level among a plurality of pass read voltages Vread0, Vread1, Vread2, and Vread3.

A threshold voltage of memory cells may be generated with an erase state E0 and program states P1, P2, and P3 according to application of a first read enhanced write mode REWM1. A program voltage Vpgm and verify voltage set (Vvf1'_1, Vvf1'_2, Vvf1'_3) may be supplied to a wordline of memory cells selected for a program operation corresponding to the read enhanced write mode REWM1. Levels of the verify voltage set (Vvf1'_1, Vvf1'_2, Vvf1'_3) may confirm that locations of the program states P1, P2, and P3 move closer to the side of the erase state E0 as compared to the default write mode WM0. According to the application of the first read enhanced write mode REWM1, memory cells may be supplied with a first pass read voltage Vread1 lower than the default pass read voltage Vread0 during a subsequent read operation. Thus, a size of a read disturbance caused by the supply of the default read voltage Vread0 may be reduced.

The program voltage Vpgm and verify voltage set (Vvf2'_1, Vvf2'_2, Vvf2'_3) may be supplied to a wordline of memory cells selected for a program operation corresponding to a second read enhanced write mode REWM2. Levels of the verify voltage set (Vvf2'_1, Vvf2'_2, Vvf2'_3) may confirm that locations of the program states P1, P2, and P3 move closer to the side of the erase state E0 as compared to the first read enhanced write mode REWM1. According to the application of the second read enhanced write mode REWM2, memory cells may be supplied with a second pass read voltage Vread2 lower than the first pass read voltage Vread1 during a subsequent read operation.

The program voltage Vpgm and verify voltage set (Vvf3'_1, Vvf3'_2, Vvf3'_3) may be supplied to a wordline of memory cells selected for a program operation corresponding to a third read enhanced write mode REWM3. Levels of the verify voltage set (Vvf3'_1, Vvf3'_2, Vvf3'_3) may confirm that locations of the program states P1, P2, and P3 move closer to the side of the erase state E0 as compared to the second read enhanced write mode REWM2. According to the application of the third read enhanced write mode REWM3, memory cells may be supplied with a third pass read voltage Vread3 lower than the second pass read voltage Vread2 during a subsequent read operation.

It will be understood that levels of verify voltage sets respectively corresponding to the read enhanced write modes REWM1, REWM2, and REWM3 are merely exemplary and may be variously changed.

Figure 11:
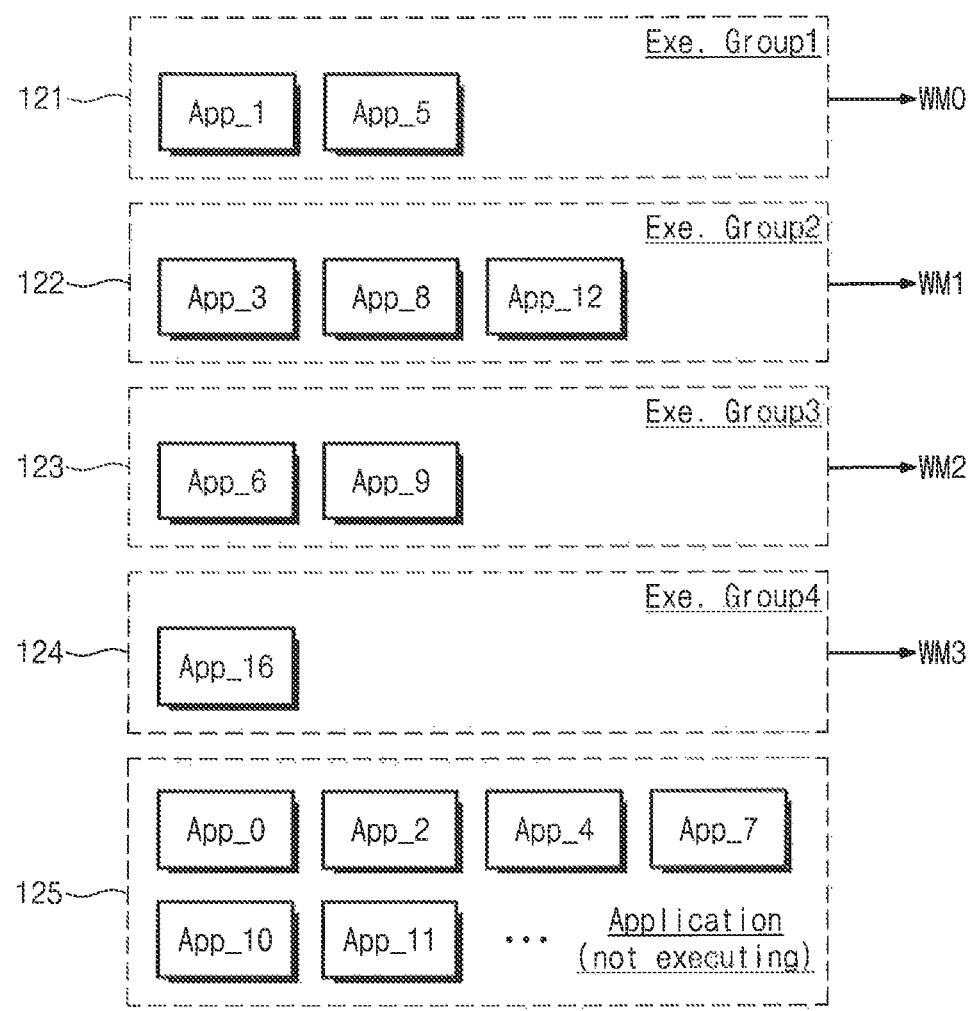
FIG. 11 is a block diagram illustrating a write mode decision method according to an exemplary embodiment of the inventive concept.

FIG. 11 is a block diagram illustrating a write mode decision method according to an exemplary embodiment of the inventive concept. Referring to FIG. 11, a write mode manager 150 may decide a write mode WMi depending on a kind of application software 120 issuing a write request WR.

The write mode manager 150 classifies application software 120 in units of groups to decide the write mode WMi. The write mode manager 150 classifies applications App_1 and App_5 being executed into a first execution group 121. The write mode manger 150 manages a write request issued from the applications App_1 and App_5 corresponding to the first execution group in a default write mode WM0.

The write mode manger 150 classifies applications App_3, App_8, and App_12 being executed into a second execution group 122. The write mode manager 150 manages a write request issued from the applications App_3, App_8, and App_13 corresponding to the second execution group 122 in the first write mode WM1.

The write mode manger 150 classifies applications App_6 and App_9 being executed into a third execution group 123. The write mode manager 150 manages a write request issued from the applications App_6 and App_9 corresponding to the third execution group 123 in the second write mode WM2.

The write mode manger 150 classifies an application App_16 being executed into a fourth execution group 124. The write mode manager 150 manages a write request issued from the application App_16 corresponding to the fourth execution group 124 in the third write mode WM3.

If each of applications App_0, App_2, App_4, App_7, App_10, App11, . . . of a non-execution group 125 is executed any time, the write mode manager 150 may classify the executed application into any one of the execution groups 121-124.

Figure 12:
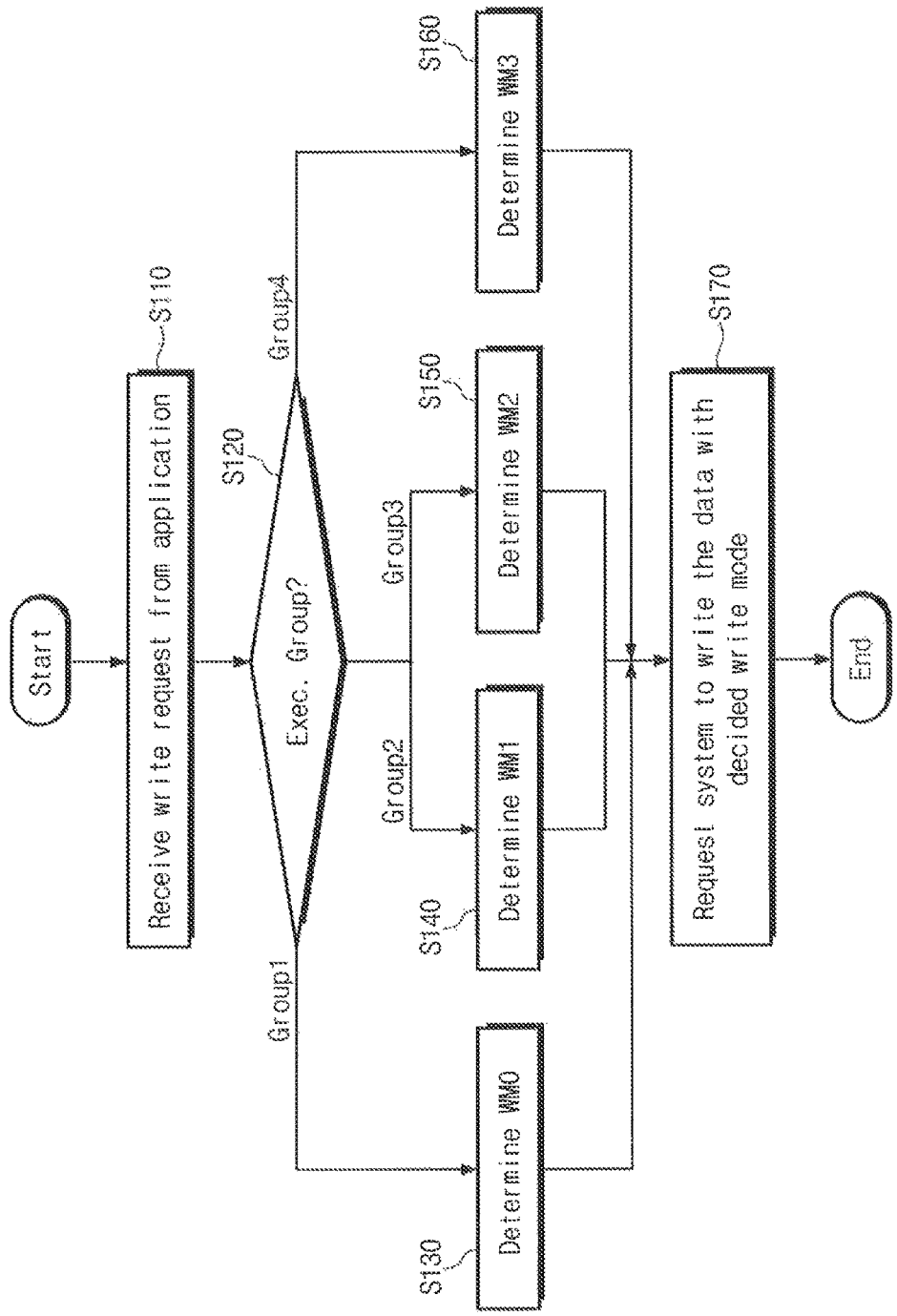
FIG. 12 is a flowchart illustrating a write mode decision method according to an exemplary embodiment of the inventive concept.

FIG. 12 is a flowchart illustrating a write mode decision method according to an exemplary embodiment of the inventive concept. A method of deciding a write mode WMi depending on a kind of executed application will now be described with reference to FIG. 12.

At operation S110, the write mode manager 150 detects and receives a write request from applications that are under execution. The write request may be issued in various situations such as a procedure that each application processes data or receives data from a network.

At operation S120, the write mode manager 150 detects which execution group includes an application issuing a write request. When the application issuing a write request belongs to a first execution group (Group1), the flow proceeds to operation S130. When the application issuing a write request belongs to a second execution group (Group2), the flow proceeds to operation S140. When the application issuing a write request belongs to a third execution group (Group3), the flow proceeds to operation S150. When the application issuing a write request belongs to a fourth execution group (Group4), the flow proceeds to operation S160.

At operation S130, the write mode manager 150 decides to write write-requested data into the nonvolatile memory device 230 (see FIG. 2) from an application according to a default write mode WM0. In other words, the write-requested data issued by an application corresponding to the first execution group (Group1) may be written into the nonvolatile memory device 230 at a high speed.

At operation S140, the write mode manager 150 decides to write write-requested data into the nonvolatile memory device 230 from an application according to a first write mode WM1. In other words, the write-requested data issued by an application corresponding to the second execution group (Group2) may be written into the nonvolatile memory device 230 at a lower speed than that in the default write mode WM0. However, the write-requested data issued by the application corresponding to the second execution group (Group2) may be written into the nonvolatile memory device 230 according to a write bias where data integrity is higher than that in the first execution group (Group1) and a voltage stress is less than that in the first execution group (Group1).

At operation S150, the write mode manager 150 decides to write write-requested data issued from an application into the nonvolatile memory device 230 according to a second write mode WM2. In other words, the write-requested data issued by an application corresponding to the third execution group (Group3) may be written into the nonvolatile memory device 230 at a lower speed than that in the first write mode WM1. However, the write-requested data issued by the application corresponding to the third execution group (Group3) may be written into the nonvolatile memory device 230 according to a write bias where data integrity is higher than that in the second execution group (Group2) and a voltage stress is less than that in the second execution group (Group2).

At operation S160, the write mode manager 150 decides to write write-requested data issued from an application into the nonvolatile memory device 230 according to a third write mode WM3. In other words, the write-requested data issued by an application corresponding to the fourth execution group (Group4) may be written into the nonvolatile memory device 230 at a lower speed than that in the second write mode WM2. However, the write-requested data issued by the application corresponding to the fourth execution group (Group4) may be written into the nonvolatile memory device 230 according to a write bias where data integrity is higher than that in the third execution group (Group3) and a voltage stress is less than that in the third execution group (Group3).

At operation S170, the write mode manager 150 requests the memory system 200 to write data into a selected memory region according to a decided write mode. At this point, information on a write mode WMi may be provided to the memory system 200 together with the write request WR. Heretofore, a write mode decision method according to an exemplary embodiment of the inventive concept has been described. According to the above-described write mode decision method, a write mode WMi is decided depending on a kind of application.

Figure 13:
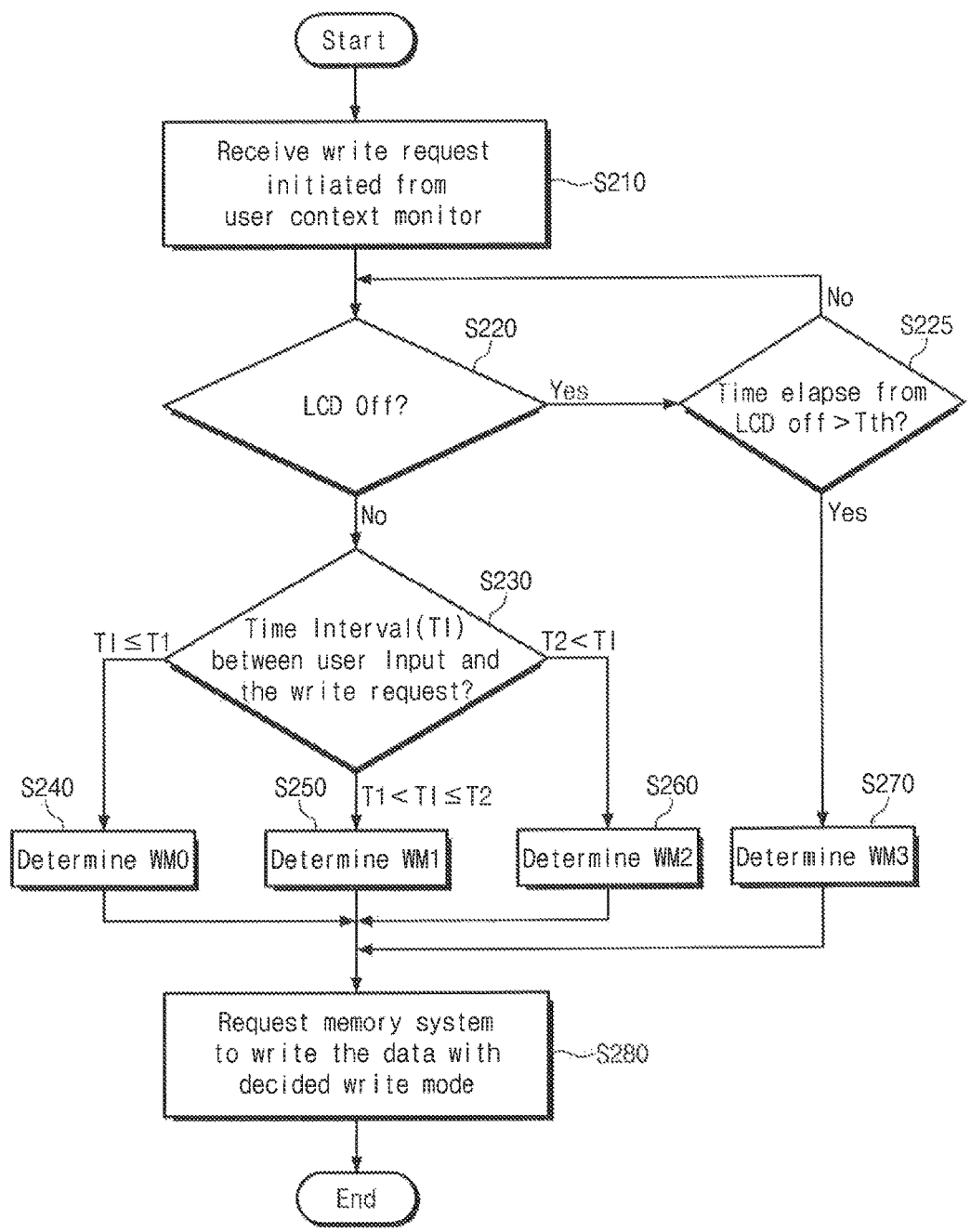
FIG. 13 is a flowchart illustrating a write mode decision method according to an exemplary embodiment of the inventive concept.

FIG. 13 is a flowchart illustrating a write mode decision method according to an exemplary embodiment of the inventive concept. According to the write mode decision method described with reference to FIG. 13, a write mode WMi is decided considering a state of an input/output device (e.g., an LCD) and an input timing detected by a user interface from a user.

At operation S210, the write mode manager 150 receives a write request set signal WMS2 from a user context monitor 130 (see FIG. 3). The user context monitor 130 may detect an ON/OFF state of an LCD 136 (see FIG. 3) of a user device 100 (see FIG. 3) and an input state of a user input of a user interface 135 (see FIG. 3). In addition, the user context monitor 130 may detect a time elapse from an ON/OFF switching timing of the LCD 136 and whether a screen save mode is executed. The user context monitor 130 may monitor a lock mode state of the user device 100, whether a power saving mode is activated, whether a user's eye gazes at the LCD 136, foreground application information, lifetime of the memory system 200, and the total amount of data written into the memory system 200 up to the present time.

At operation S220, the write mode manager 150 detects the ON/OFF state of the LCD 136. The ON state of the LCD 136 means a state where an image is displayed on the LCD 136, while the OFF state of the LCD 136 means a state where information or an image is not displayed on the LCD 136. When the LCD 136 is in the ON state, the flow proceeds to operation S230. When the LCD 136 is in the OFF state, the flow proceeds to operation S225.

At operation S225, the write mode manager 150 monitors a time elapse from the time when the LCD 136 is turned off. If the time elapse exceeds a reference time Tth (th>0) (Yes direction), the flow proceeds to operation S270. If the time elapse does not reach the reference time Tth (No direction), the flow returns to operation S220 to monitor the state of the LCD 136. If the reference time Tth increases in length, it may be difficult for the user to sense write mode WM switching which occurs following the OFF state of the LCD 136.

An exemplary embodiment of the inventive concept has been described with reference to the ON/OFF state of the LCD 136 as an example. However, the write mode manager 150 may perform an operation with reference to not only the ON/OFF state of the LCD 136 but also a screen save mode, a screen lock mode, and a power saving mode of the user device 100, whether the user's eye gazes at the LCD 136, and whether a foreground application being executed is associated with a response with respect to the user.

The write mode manager 150 may forcibly decide a write mode with reference to lifetime information of the memory system 200 and the total amount of data written into the memory system 200 up to the present time. For example, when the lifetime of the memory system 200 cannot be guaranteed because a write operation is relatively frequently performed in the memory system 200, the write mode manager 150 may select a write mode capable of extending the lifetime of the memory system 200 in preference to the other conditions. In this case, an extended lifetime may be guaranteed although the write speed is made low. To achieve this, an interface is added for receiving lifetime information and the total amount of written data from the memory system 200.

At operation S230, the write mode manager 150 detects a time interval between a write request and a user input provided from the user interface 135. When the write request is issued by the user input, a rapid response may be provided to the user or there is no problem to provide a relatively slow response to the user in certain cases. A high-speed write mode is supported to provide a rapid response to the user. When a time interval TI between a user input time and a write request is shortest (e.g., TI≤T1), the flow proceeds to operation S240. When the time interval TI is longer than T1 and less than T2 (e.g., T1<TI≤T2), the flow proceeds to S250. When the time interval TI is longer than T2 (e.g., T2<TI), the flow proceeds to operation S260.

At operation S240, the write mode manager 150 decides to program write-requested data into the nonvolatile memory device 230 (see FIG. 2) depending on a default write mode WM0. At operation S250, the write mode manger 150 decides to program the write-requested data into the nonvolatile memory device 230 depending on a first write mode WM1. At operation S260, the write mode manger 150 decides to program the write-requested data into the nonvolatile memory device 230 depending on a second write mode WM2. At operation S270, the write mode manger 150 decides to program the write-requested data into the nonvolatile memory device 230 depending on a third write mode WM3.

At operation S280, the write mode manager 150 may request the memory system 200 to write data into a selected memory region depending on a decided write mode. At this point, information on the write mode WMi may be provided to the memory system 200 together with the write request WR.

Heretofore, a write mode decision method for deciding a write mode with reference to information provided by the user context monitor 130 (see FIG. 3) has been described.

Figure 14:
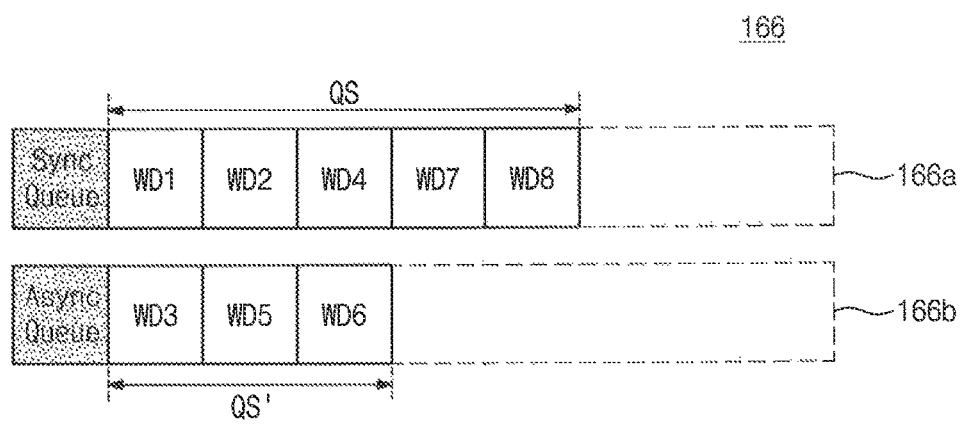
FIG. 14 is a block diagram illustrating a write mode decision method according to an exemplary embodiment of the inventive concept.

FIG. 14 is a block diagram illustrating a write mode decision method according to an exemplary embodiment of the inventive concept Referring to FIG. 14, the write mode manager 150 may decide a write mode for a current write request depending on a state of a write buffer 166 provided from a write queue monitor 160. The write buffer 166 may be managed by dividing it into a synchronous queue 166a and an asynchronous queue 166b.

When a write request to the write buffer 166 occurs, data is classified as part of the synchronous queue 166a or the asynchronous queue 166b according to characteristics of the write request by an input/output scheduler 165. If a high-speed write operation is not performed, write data that would cause a user to feel performance deterioration may be stored in the synchronous queue 166a. For example, write data WD1, WD2, WD4, WD7, and WD8 are stored in the synchronous queue 166a. However, if a high-speed write operation is not performed, write data that would cause a user to feel performance deterioration may be stored in the synchronous queue 166a. For example, write data WD3, WD5, and WD6 are stored in the asynchronous queue 166b.

The write queue monitor 160 according to an exemplary embodiment of the inventive concept receives information on a size of accumulated write data (e.g., queue size (QS)) from the input/output scheduler 165 or the write buffer 166. The write queue monitor 160 transfers the information on the queue size QS to the write mode manager 150. The write queue monitor 160 may transfer a queue size QS of data accumulated in the synchronous queue 166a and a queue size QS' of data accumulated in the asynchronous queue 166b to the write mode manager 150.

The write mode manager 150 may decide a write mode WMi of current write-requested data with reference to the queue sizes QS and QS'. In other words, the write mode manager 150 may select a high-speed write mode when a queue size to be written into the memory system 200 is large.

In addition, the write mode manager 150 may select a low-speed write mode when a queue size to be written into the memory system 200 is relatively small. The write mode manager 150 may decide a write mode with reference to the queue size QS of the synchronous queue 166a. Alternatively, the write mode manager 150 may assign write data of the synchronous queue 166a to a high-speed write mode and assign write data of the asynchronous queue 166b to a low-speed write mode.

Figure 15:
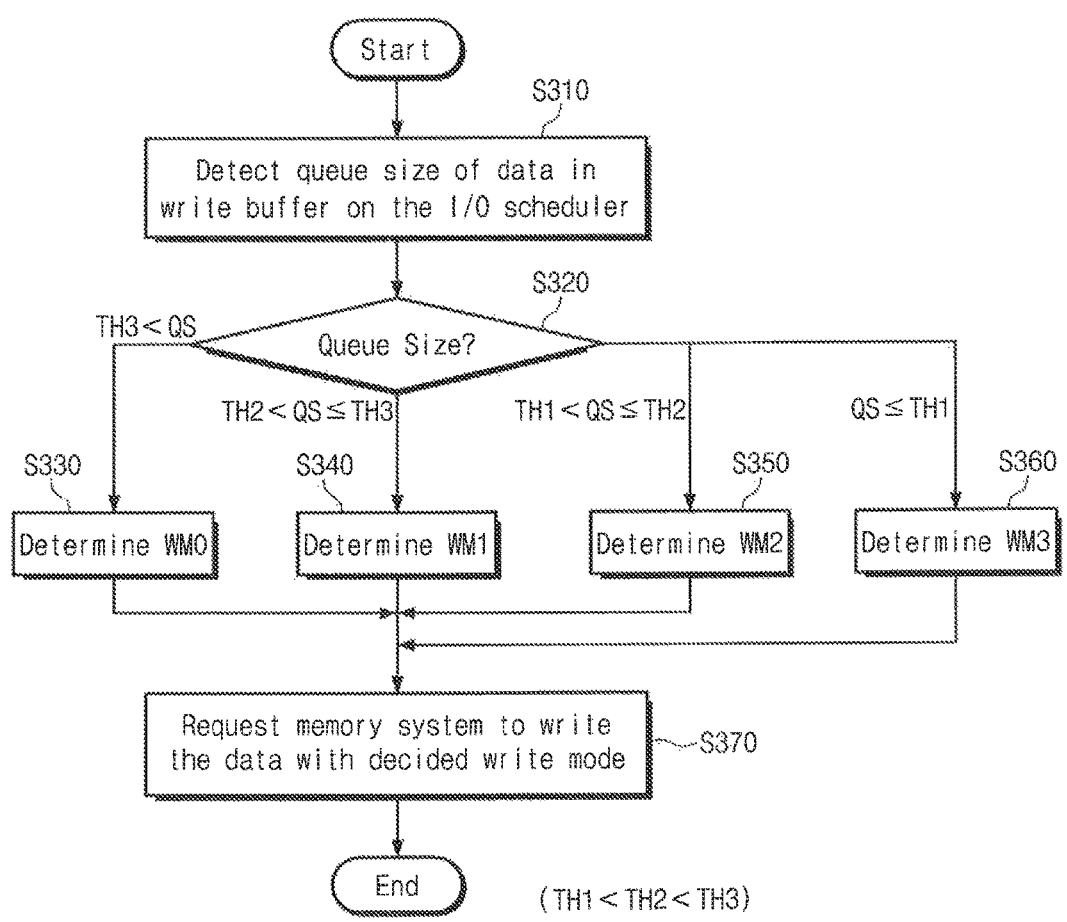
FIG. 15 is a flowchart illustrating a write mode decision method according to an exemplary embodiment of the inventive concept.

FIG. 15 is a flowchart illustrating a write mode decision method according to an exemplary embodiment of the inventive concept. A write mode decision method for deciding a write mode WMi depending on a queue size accumulated in a write buffer 166 will now be described with reference to FIG. 15.

At operation S310, the write mode manager 150 receives a write request and information on a queue size QS of data currently stored in the write buffer 166 from the write queue monitor 160. The write mode manager 150 may detect a queue size of write data accumulated in the write buffer 166.

At operation S320, the write mode manager 150 decides a write mode WMi depending on a queue size QS. When the queue size QS exceeds a third threshold TH3, at operation S330, the write mode manager 150 may assign a default write mode WM0 to write currently write-requested data at a high speed. When the queue size QS is greater than a second threshold TH2 and less than the third threshold TH3, at operation S340, the write mode manager 150 may assign a first write mode WM1 with respect to the currently write-requested data. When the queue size QS is greater than the first threshold TH1 and less than the second threshold TH2, at operation S350, the write mode manager 150 may assign a second write mode WM2 with respect to the currently write-requested data. When the queue size QS is less than the first threshold TH1, at operation S360, the write mode manager 150 may assign a third write mode WM3 with respect to the currently write-requested data.

At operation S370, the write mode manager 150 requests the memory system 200 to write data into a selected memory region depending on the decided write mode WMi. At this point, information on the write mode WMi may be provided to the memory system 200 together with the write request WR.

Figure 16:
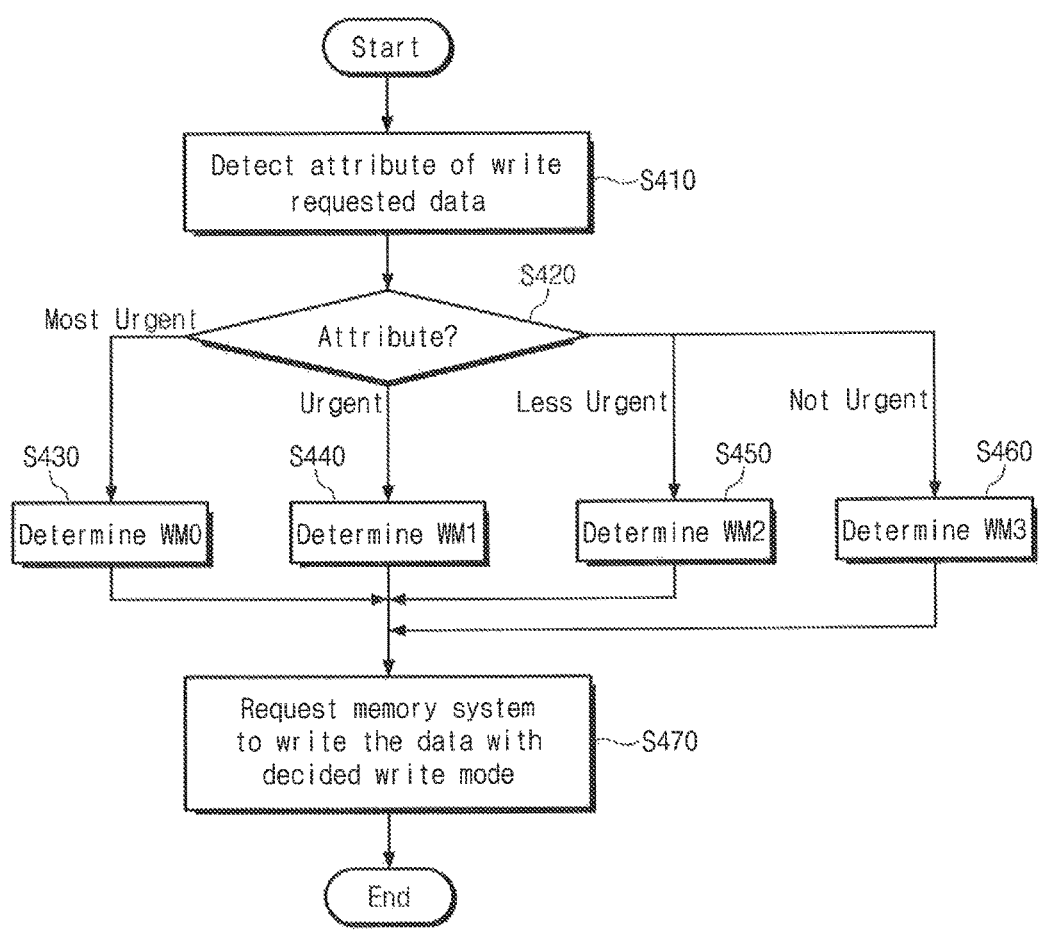
FIG. 16 is a flowchart illustrating a write mode decision method according to an exemplary embodiment of the inventive concept.

FIG. 16 is a flowchart illustrating a write mode decision method according to an exemplary embodiment of the inventive concept. A method of deciding a write mode WMi according to an attribute of write-requested data will be described with reference to FIG. 16.

At operation S410, the write mode manager 150 detects an attribute of write-requested data. Urgency to writing of data will be explained herein as an example of the attribute of the write-requested data. However, the attribute of the write-requested data may include a significance of data or a size of data.

At operation S420, the write mode WMi is decided according to the attribute of the write-requested data. When the attribute of the write-requested data requires a most urgent write (Most Urgent), the flow proceeds to operation S430 at which a default write mode WM0 is assigned to write the currently write-requested data at a high speed. When the attribute of the write-requested data requires a relatively urgent write (Urgent), the flow proceeds to operation S440 at which a first write mode WM1 is assigned to write the currently write-requested data. When the attribute of the write-requested data requires a relatively less urgent write (Less Urgent), the flow proceeds to operation S450 at which a second write mode WM2 is assigned to the currently write-requested data. When the attribute of the write-requested data requires a non-urgent write (Not Urgent), the flow proceeds to operation S460 at which a third write mode WM3 is assigned to write the currently write-requested data.

At operation S470, the write mode manager 150 may request the memory system 200 to write data into a selected memory region depending on the decided write mode. At this point, information on the write mode WMi may be provided to the memory system 200 together with the write request WR.

Figure 17:
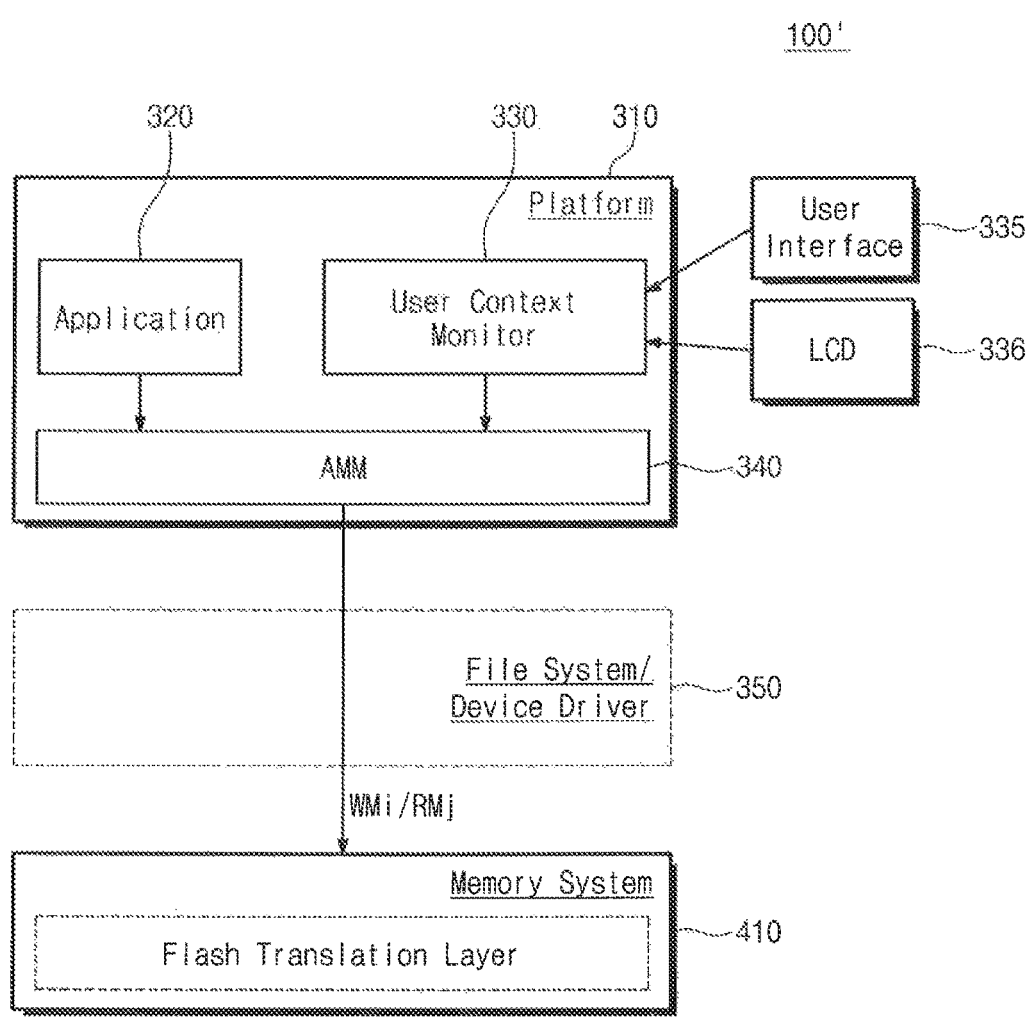
FIG. 17 is a block diagram showing a software structure of a host in FIG. 2, according to an exemplary embodiment of the inventive concept.

FIG. 17 is a block diagram showing a software structure of the host 100 in FIG. 2, according to an exemplary embodiment of the inventive concept. As illustrated, software 100' of the host 100 may include a platform 310 and a file system/device driver 350. A access mode manager 340 access mode manager 340 may be included in a layer of the platform 310.

The platform 310 may include application software 320, a user context monitor 330, and the access mode manager 340. The access mode manager 340 access mode manager 340 may monitor a kind of the application software 320 issuing a write request or an attribute of the write request. The user context monitor 330 may monitor whether there is a user input or an input period. The user context monitor 330 may monitor an ON/OFF state of an LCD 336. The user context monitor 330 may detect an ON/OFF state of a user interface 335 or the LCD 336 and an input state of a user input of the user interface 335. In addition, the user context monitor 330 may detect a time elapse from an ON/OFF switching timing of the LCD 336 and whether a screen save mode is executed. The user context monitor 330 may monitor a lock mode state of a user device, whether a power saving mode is activated, whether a user's eye gazes at the LCD 336, foreground application information, lifetime of a memory system 410, and the total amount of data written into the memory system 410 up to the present time and provide the monitored information to the access mode manager 340. Thus, any one of a plurality of write modes may be selected by the access mode manager 340. The selected write mode WMi or read mode RMj may be transferred to the side of the memory system 410 via the file system/device driver 350.

Heretofore, a structure of the software 100' of a host according to an exemplary embodiment of the inventive concept has been described. However, a location of the write mode manager 150 on a software layer is not limited to the example shown above.

Figure 18A:
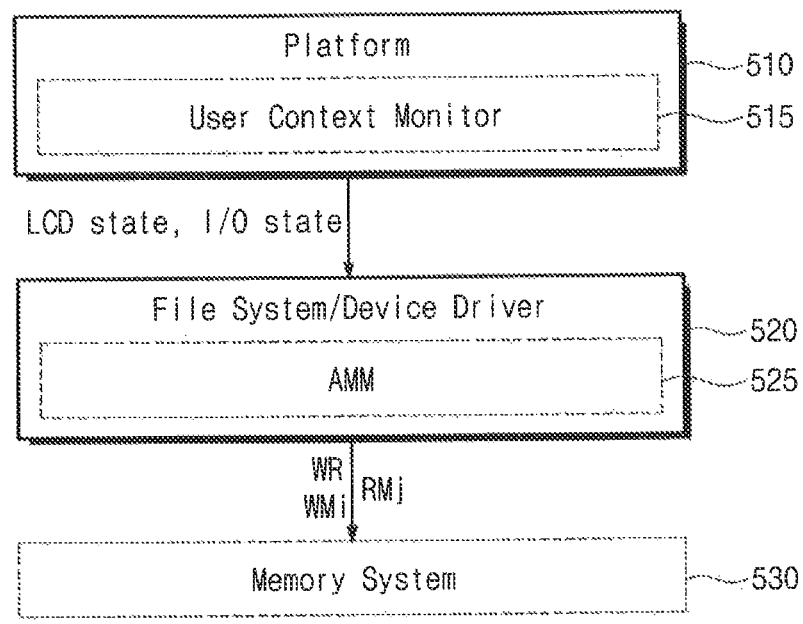
FIGS. 18A and 18B are block diagrams illustrating an interface method in a software layer of a host for applying exemplary embodiments of the inventive concept.
Figure 18B:
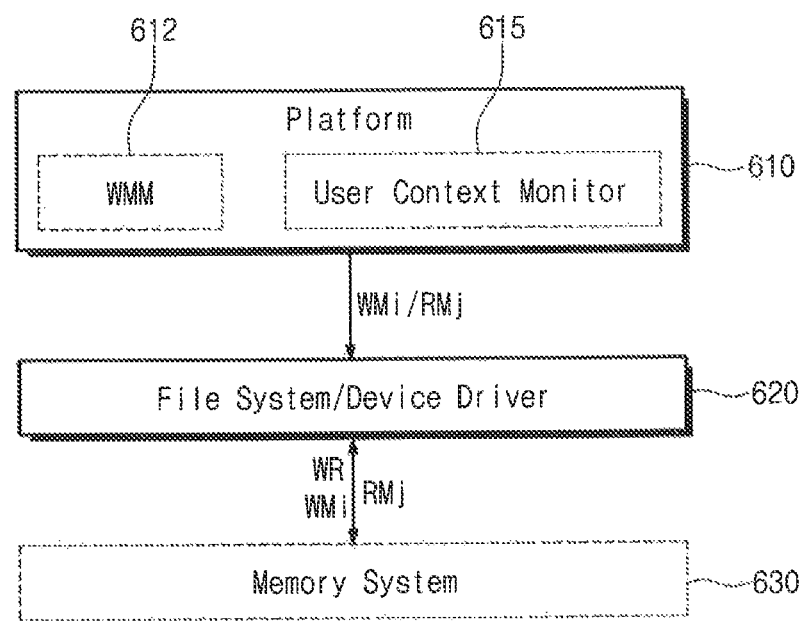

FIGS. 18A and 18B are block diagrams illustrating an interface method in a software layer of a host for applying exemplary embodiments of the inventive concept.

In FIG. 18A, an example of a access mode manager 525 included in a layer of a file system/device driver 520 is shown. The access mode manager 525 may receive an LCD state and an input/output state of a user interface from a platform 510. The access mode manager 525 may decide a write mode or read mode based on information from the platform 510 and transfer information on a write request WR and a access mode WMi/RMj to a memory system 530. The platform 510 may include a user context monitor 515.

In FIG. 18B, an example of a write mode manager 612 included in a platform 610 is shown. The access mode manager 612 may receive an LCD state and an input/output state of a user interface from the platform 610 and decide a access mode WMi/RMj within the platform 610. The access mode WMi/RMj decided by the access mode manager 612 in the platform 610 may be bypassed without being corrected by a file system/device driver 620. A bypassed write request WR and the bypassed access mode WMi/RMj may be transferred to a memory system 630. The platform 610 may include a user context monitor 615.

FIG. 19 is a table showing write mode WMi according to an embodiment of the inventive concept. Referring to FIG. 19, each of the write modes WMi defines a write speed of the nonvolatile memory device.

In the embodiment, a write mode WMi is classified into eight types WM0~WM7 as shown. However, it will be understood that a write mode WMi may be divided into more than or less than eight types. The write mode WM0 corresponds to default mode. Thus, if the write mode information is not received from the host 100, the memory controller 210 writes the received data into nonvolatile memory device 230 with default write mode WM0. In the default write mode WM0, an incremental step of a program (ISPP) voltage may be a relatively great value. Thus, write speed in the default write mode WM0 may be higher than that in the other write modes WM1~WM5. In some embodiment, the write speed in the default write mode WM0 may be highest of all the write modes.

As the write mode WM1 is applied, a write bias may be supplied to a wordline of memory cells selected for a program operation corresponding to the write mode WM1. Thus, program speed of the write mode WM1 may be 75% of the default write mode WM0. As the write mode WM2 is applied, a write bias may be supplied to a wordline of memory cells selected for a program operation corresponding to the write mode WM2. Thus, program speed of the write mode WM2 may be 50% of the default write mode WM0. As the first write mode WM3 is applied, a write bias may be supplied to a wordline of memory cells selected for a program operation corresponding to the write mode WM3. Thus, the program speed of the write mode WM3 may be 25% of the default write mode WM0. In this way, the program speed of write modes WM4 and WM5 correspond to 10% and 5% of the default write mode WM0. In a word, write modes WM1-WM5 indicates a slow mode supplied from the host 100.

On the contrary, fast write modes WM6, WM7 can be applied from the host 100. The program speed of the write mode WM6 may be 125% of the default write mode WM0. The program speed of the write mode WM7 may be 150% of the default write mode WM0.

The write mode WMi is determined in the Host 100 and then transmitted to the Memory System 200. The Host 100 writes the write mode WMi on a register of the Memory System 200. Memory System 200 writes write requested data into the nonvolatile memory device with write speed according to the write mode written on the register.

FIG. 20 is a table showing read mode RMj according to an embodiment of the inventive concept. Referring to FIG. 20, each of the read modes RMj defines a read speed of the nonvolatile memory device.

In the embodiment, read mode RMj is classified into eight types RM0~RM7 as shown. However, it will be understood that a read mode RMj may be divided into more than or less than eight types. The read mode RM0 corresponds to default mode. Thus, if the read mode information is not received from the host 100, the memory controller 210 read data from nonvolatile memory device 230 with default read mode RM0. Thus, the read speed in the default read mode RM0 may be higher than that in the other read modes RM1~RM5. In another embodiment, the write speed in the default read mode RM0 may be highest of all the read modes.

As the read mode RM1 is received, a read bias may be supplied to a wordline of memory cells selected for a read operation corresponding to the read mode RM1. Thus, read speed of the read mode RM1 may be 75% of the default read mode RM0.

As the read mode RM2 is applied, a read bias may be supplied to a wordline of memory cells selected for a read operation corresponding to the read mode RM2. Thus, the read speed of the read mode RM2 may be 50% of the default read mode RM0. As the read mode RM3 is applied, a read bias may be supplied to a wordline of memory cells selected for a read operation corresponding to the read mode RM3. Thus, the read speed of the read mode RM3 may be 25% of the default read mode RM0. In this way, the read speed of read modes RM4 and RM5 correspond to 10% and 5% of the default read mode RM0. In a word, read modes RM1~RM5 indicates a slow read mode supplied from the host 100.

The fast read modes RM6, RM7 can be applied from the host 100. The read speed of the read mode RM6 may be 125% of the default read mode RM0. The read speed of the read mode RM7 may be 150% of the default read mode RM0.

The read mode RMj is determined in the Host 100 and then transmitted to the Memory System 200. The Host 100 writes the read mode RMj on a register of the Memory System 200. Memory System 200 accesses the nonvolatile memory device with read speed according to the read mode RMj written on the register.

Figure 21:
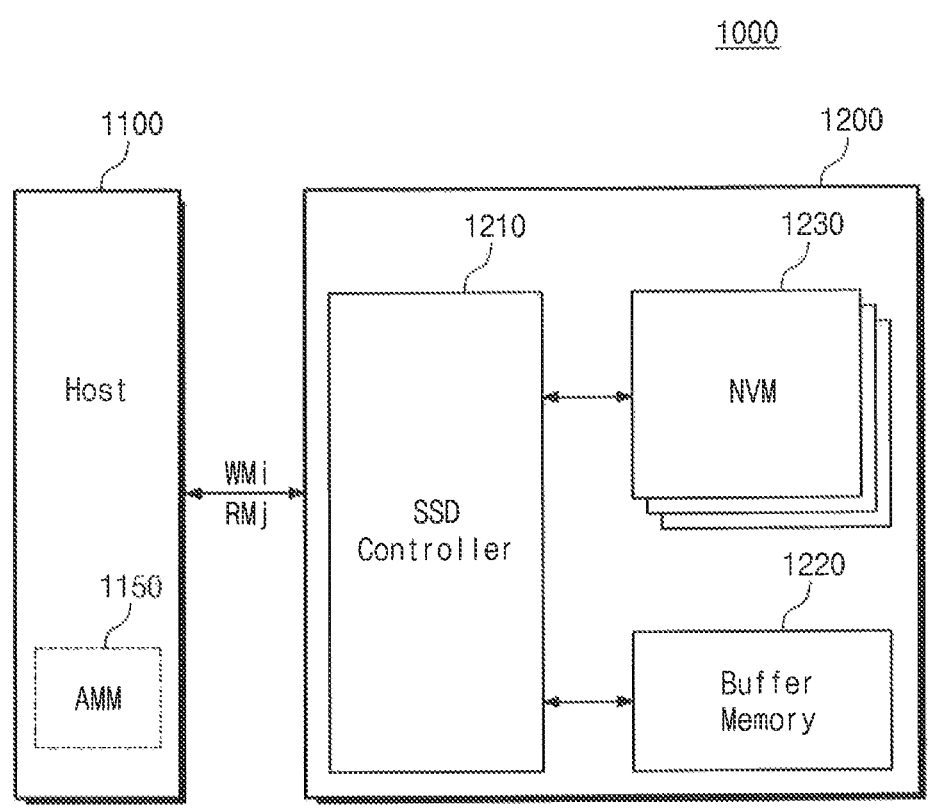
FIG. 21 is a block diagram of a user device including a solid state disk according to an exemplary embodiment of the inventive concept.

FIG. 21 is a block diagram of a user device 1000 including a solid state disk (hereinafter referred to as "SSD") according to an exemplary embodiment of the inventive concept. As illustrated, the user device 1000 includes a host 1100 and an SSD 1200. The SSD 1200 includes an SSD controller 1210, a buffer memory 1220, and a nonvolatile memory 1230.

The host 1100 includes a write mode manager 1150. The write mode manger 1150 may decide an access mode WMi/RMj depending on a kind of application that is being driven, an ON/OFF state of an LCD, a user input time interval for input to a user interface, a size of data accumulated in a write buffer, and an attribute of write data.

The SSD controller 1210 provides a physical connection between the host 1100 and the SSD 1200. In other words, the SSD controller 1210 provides interfacing with the SSD 1200, which corresponds to a bus format of the host 1100. In particular, the SSD controller 1210 may vary an access speed to the nonvolatile memory device 1230 with reference to a access mode WMi/RMj provided from the host 1100. In other words, the SSD controller 1210 may adjust an access bias of the nonvolatile memory device 1230 depending on the access mode WMi/RMj. In other words, the SSD controller 1210 may perform various memory management operations according to the level of an erase voltage. The bus format of the host 1100 may include a USB, an SCSI, a PCI express, an ATA, a PATA, a SATA, and a SAS.

Write data provided from the host 1100 or data read from the nonvolatile memory device 1230 is temporarily stored in the buffer memory 1220. When data exiting the nonvolatile memory device 1230 is cached in a read request of the host 1100, the buffer memory 1220 supports a cache function to directly provide the cached data to the host 1100. In general, data transfer speed using a bus format (e.g., SATA or SAS) of the host 1100 is much higher than transfer speed of a memory channel of the SSD 1200. In other words, when the interface speed of the host 1100 is significantly high, a high-capacity buffer memory 1220 may be provided to minimize performance degradation caused by a speed difference.

The nonvolatile memory device 1230 is provided as a storage medium of the SSD 1200. For example, the nonvolatile memory device 1230 may be provided as a NAND-type flash memory having a mass storage capacity. The nonvolatile memory device 1230 may include a plurality of memory devices. In this case, each of the memory devices is connected to the SSD controller 1210 in units of channels.

While a NAND-type flash memory has been described an example of the nonvolatile memory device 1230, the nonvolatile memory device 1230 may include other nonvolatile memory devices. For example, PRAM, MRAM, ReRAM, or NOR flash memory may be used as a storage medium and the flash memory may be applied to a memory system in which different kinds of memory devices are mixed. The nonvolatile memory device 1230 includes a buffer region for a buffer program operation and a main region for a main program operation.

Figure 22:
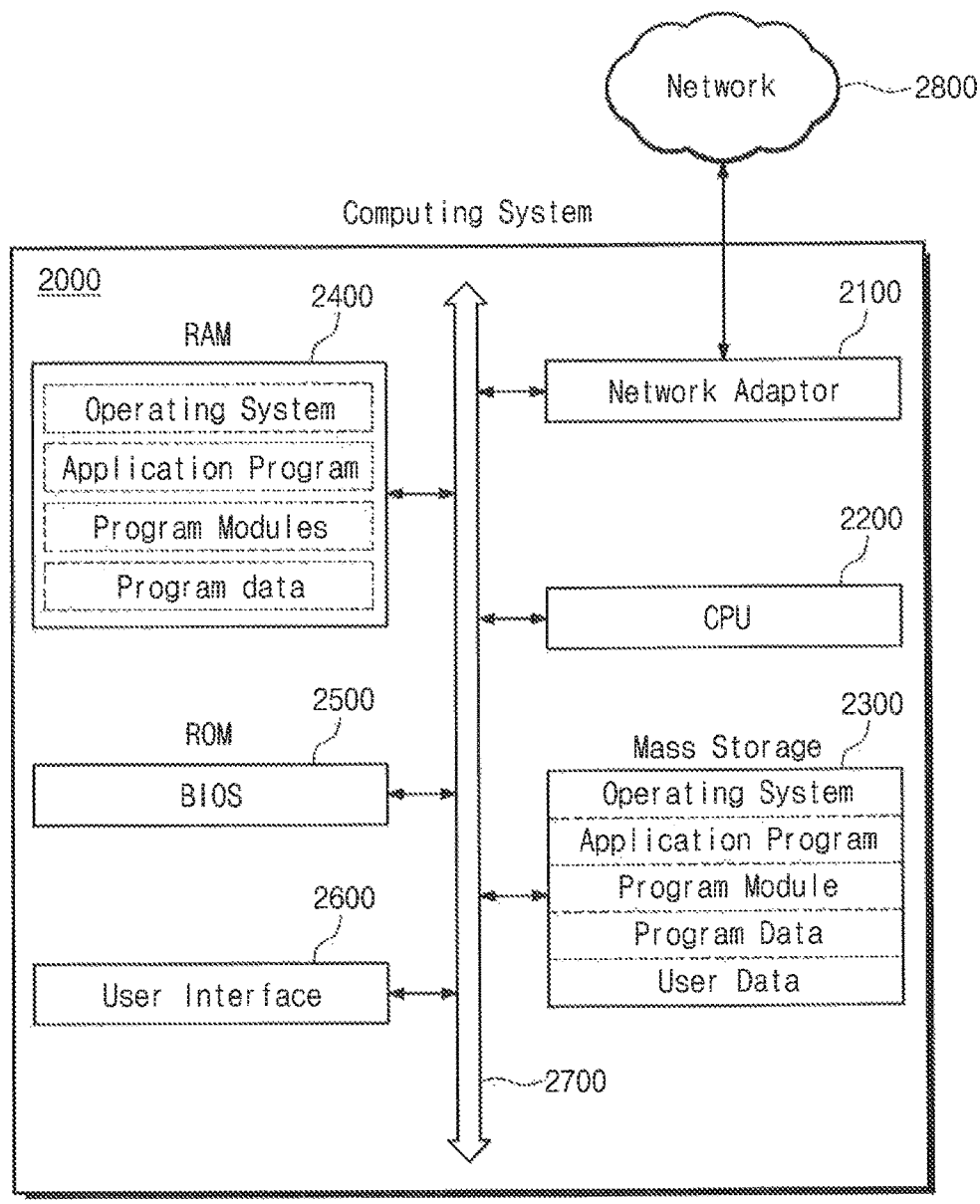
FIG. 22 is a block diagram of a computing system according to an exemplary embodiment of the inventive concept.

FIG. 22 is a block diagram of a computing system 2000 according to an exemplary embodiment of the inventive concept. As illustrated, the computing system 2000 includes a network adaptor 2100, a CPU 2200, a mass storage 2300, a RAM 2400, a ROM 2500, and a user interface 2600, which are electrically connected to a system bus 2700.

The network adaptor 2100 provides interfacing between the computing system 2000 and an external network 2800. The CPU 2200 may control an overall operation to drive an operating system and an application program which are resident on the RAM 2400. The mass storage 2300 stores data required for the computing system 2000. For example, the mass storage 2300 may store an operating system used to drive the computing system 2000, an application program, various program modules, program data, user data, and the like.

The RAM 2400 is used as a working memory of the computing system 2000. Upon booting, the operating system, the application program, the various program modules, and program data used to drive programs and various program modules read out from the mass storage 2300 are loaded on the RAM 2400. The ROM 2500 stores a basic input/output system (BIOS) which is activated before the operating system is driven upon booting. Information exchange between the computer system 2000 and a user is made via the user interface 2600.

In addition, the computing system 2000 may further include a battery, a modem, and the like. Although not shown, the computer system 2000 may further include an application chipset, a camera image processor (CIS), a mobile dynamic random access memory (DRAM), and the like.

The mass storage 2300 may include a nonvolatile memory device employing a memory management method according to an exemplary embodiment of the inventive concept. In other words, the mass storage 2300 may perform wear leveling depending on effective wearing EW or cumulative effective wearing CEW. The mass storage 2300 may vary a write mode or an erase mode according to a request of a host or operating conditions. The mass storage 2300 may include an SSD, a multimedia card (MMC), a secure digital card (SD card), a micro SD card, a memory stick, and ID card, a personal computer memory card international association (PCMCIA) card, a chip card, a USB card, a smart card, a compact flash card (CF card), an embedded MMC (eMMC) or the like.

Figure 23:
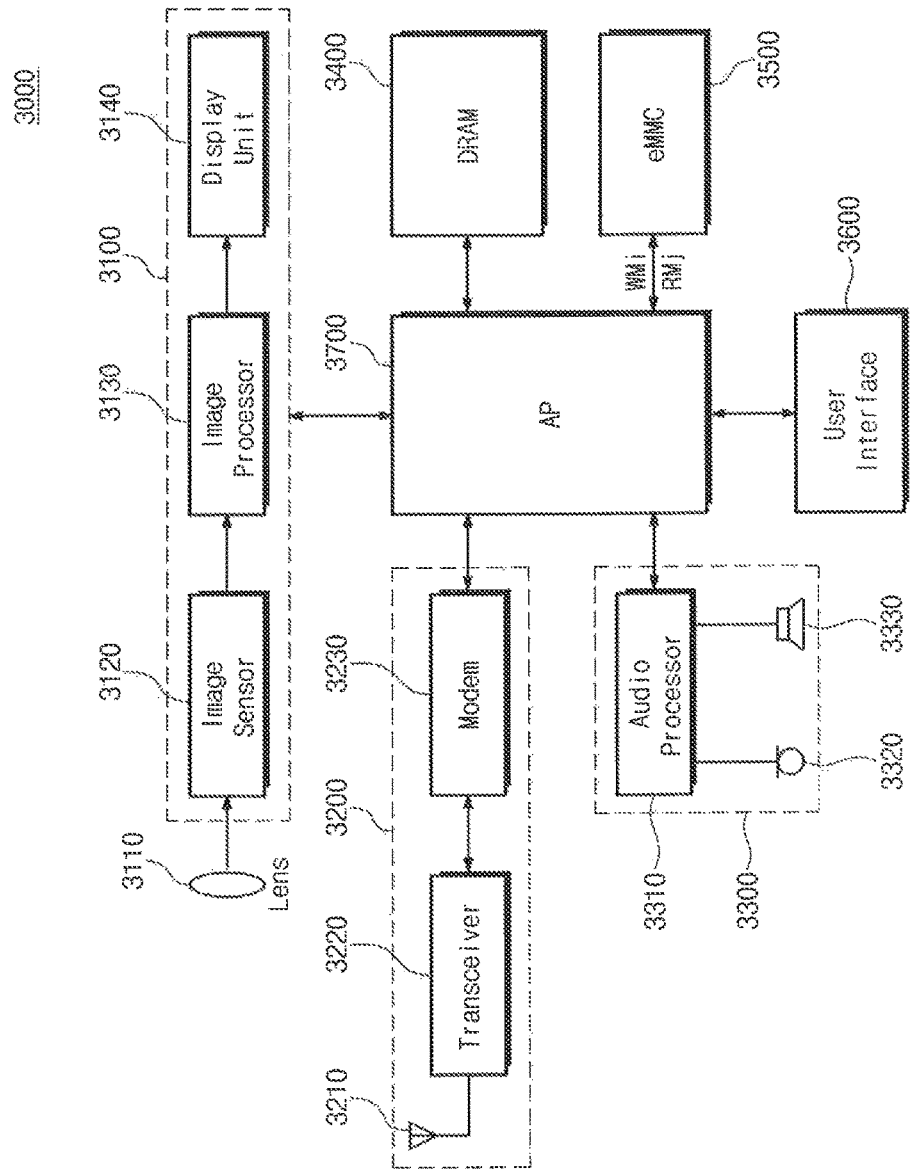
FIG. 23 is a block diagram of a handheld terminal according to an exemplary embodiment of the inventive concept.

FIG. 23 is a block diagram of a handheld terminal 3000 according to an exemplary embodiment of the inventive concept. As illustrated, the handheld terminal 3000 includes an image processing unit 3100, a wireless transceiver unit 3200, an audio processing unit 3300, a DRAM 3400, an eMMC 3500, a user interface 3600, and an application processor 3700.

The image processing unit 3100 includes a lens 3110, an image sensor 3120, an image processor 3130, and a display unit 3140. The wireless transceiver unit 3210 includes an antenna 3210, a transceiver 3220, and a modem 3230. The audio processing unit 3300 includes an audio processor 3310, a microphone 3320, and a speaker 3330.

The eMMC 3500 may be provided as a nonvolatile memory device driven according to an exemplary embodiment of the inventive concept. In this case, the eMMC 3500 may be erased by an erase voltage of various levels. The eMMC 3500 may vary a subsequent access mode depending on the level of the erase voltage. In addition, the application processor 3700 may decide a data access mode WMi/RMj to the eMMC 3500 according to states of the image processing unit 3100, the wireless transceiver unit 3200, the audio processing unit 3300, the DRAM 3400, and the user interface 3600.

A nonvolatile memory device and/or a memory controller according to an exemplary embodiment of the inventive concept may be packaged as one of various types to be subsequently embedded. For example, a flash memory device and/or a memory controller according to an exemplary embodiment of the inventive concept may be packaged by one of Package on Package (PoP), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline Integrated Circuit (SOIC), Shrink Small Outline Package (SSOP), Thin Small Outline Package (TSOP), System In Package (SIP), Multi Chip Package (MCP), Wafer-level Fabricated Package (WFP), and Wafer-Level Processed Stack Package (WSP).

As described above, in accordance with an exemplary embodiment of the inventive concept, a write mode for a nonvolatile memory device is decided in a host level to minimize deterioration of a nonvolatile memory device that results from a driving environment. Thus, lifetime of the nonvolatile memory device can be extended while minimizing a burden on a memory system including the nonvolatile memory device.

While the inventive concept has been particularly shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. A method of accessing a nonvolatile memory device in a storage device, the method comprising:

receiving access mode information to be written into at least one register from an external device, wherein the access mode information includes one of a plurality of operation modes to access the nonvolatile memory device, and when the access mode information is write mode information, the write mode information is determined at the external device in response to first, second and third write mode set signals, the first write mode set signal being decided by application software driven at the external device, the second write mode set signal being generated according to a state of a user interface at the external device, and the third write mode set signal being based on a queue size of a write buffer of the external device;
reading the access mode information from the at least one register;
selecting one operation mode among the plurality of operation modes according to the access mode information; and
performing an access operation based on the selected operation mode,
wherein a first operation mode of the plurality of operation modes corresponds to increase throughput of the nonvolatile memory device, and a second operation mode of the plurality of operation modes corresponds to increase lifetime of the nonvolatile memory device,
wherein an operation speed of the first operation mode is faster than an operation speed of the second operation mode, and
wherein operation voltages used to perform a plurality of functions in each of the plurality of operation modes are associated with a plurality of different effective wear levels.

2. The method of claim 1, wherein the access mode information is decided according to a kind of an application software issuing an access request at the external device.

3. The method of claim 1, further comprising:
monitoring an access request to the non-volatile memory device; and
detecting at least one of an application software issuing the access request, a user context, a queue size of the write buffer, an attribute of a write-requested data, and an operation mode of a user device including the storage device,
wherein the user context includes a time interval between a time of the access request and a time of an input to the user interface or between the time of the access request and a time of an ON/OFF state of a display.

4. The method of claim 3, wherein when the display is in the OFF state and a reference time is elapsed from a time point when the display is turned off, an access mode information with a lowest access speed or highest data integrity is decided.

5. The method of claim 3, wherein the user context includes information on whether a user's eye gazes at a display.

6. The method of claim 3, wherein access mode information corresponding to a lowest operation speed mode is received to be used for writing a write-requested data when the queue size of the write buffer storing the write-requested data is less than a minimum reference value.

7. The method of claim 6, wherein access mode information with a highest write speed is received to be used for writing the write-requested data when the queue size of the write buffer storing the write-requested data exceeds a maximum reference value.

8. The method of claim 6, wherein the queue size of the write buffer corresponds to the amount of write data accumulated in a synchronous queue.

9. The method of claim 3, wherein the operation mode of the user device includes a screen save mode, a lock mode, or a power saving mode.

10. The method of claim 1, wherein the at least one register comprises a volatile memory element.

11. A user device including a display, a user interface, and a write buffer, comprising:
a memory system configured to vary an access bias to a nonvolatile memory device depending on an access mode, wherein the access mode includes one of a plurality of access biases of the nonvolatile memory device; and
a host configured to dynamically vary the access mode for write-requested data or read-requested data according to at least one of a lifetime of the memory system, and a total amount of data written into the nonvolatile memory device,
wherein voltages corresponding to the plurality of access biases are associated with a plurality of different effective wear levels such that a first voltage is assigned to a first memory block of a first effective wear level having a first oxide deterioration of a first memory cell and a second voltage is assigned to a second memory block of a second effective wear level having a second oxide deterioration of a second memory cell, wherein the second oxide deterioration is greater than the first oxide deterioration,
wherein the host includes an access mode manager configured to decide the access mode for the write-requested data in response to first second and third write mode set signals,
wherein the host includes an application software to decide the first write mode set signal, the host includes a user context monitor to generate the second write mode set signal according to a state of the display, and
wherein the host includes a write queue monitor configured to detect a queue size of the write buffer and generate the third write mode set signal based on the queue size.

12. The user device of claim 11, wherein the access mode manager is a software module driven in a platform layer of the host.

13. The user device of claim 11, wherein the access mode manager is a software module driven in a file system or device driver layer of the host.

14. A method of accessing a memory system including at least one nonvolatile memory device, comprising:
receiving access speed information of the nonvolatile memory device from an external device, and when the access speed information corresponds to a write operation, the access speed information is determined in response to first, second and third write mode set signals, the first write mode set signal being decided by application software driven at the external device, the second write mode set signal being generated according to a state of an interface at the external device, and the third write mode set signal being based on a queue size of a write buffer of the external device; and
accessing the nonvolatile memory device with reference to the received access speed information,
wherein the access speed information is associated with an access speed of the nonvolatile memory device,
wherein the access speed is modified through setting an access bias of the nonvolatile memory device,
wherein the access bias is one of a plurality of access biases and is included in the access speed information,
wherein a lifetime of the nonvolatile memory device or a total amount of data written into the nonvolatile memory device is used to determine the access speed information, and
wherein voltages corresponding to the plurality of access biases are associated with a plurality of different effective wear levels such that a first voltage is assigned to a first memory block of a first effective wear level having a first oxide deterioration of a first memory cell and a second voltage is assigned to a second memory block of a second effective wear level having a second oxide deterioration of a second memory cell, wherein the second oxide deterioration is greater than the first oxide deterioration.

15. The method of claim 14, wherein the access speed information is determined according to an operation status of the external device.

16. The method of claim 14, wherein the accessing the nonvolatile memory device corresponds to at least one of the write operation, a read operation and an erase operation.

17. The method of claim 14, further comprising:
receiving an access request excluding the access speed information; and
accessing the nonvolatile memory device in accordance with a default access mode,
wherein the default access mode corresponds to a highest access speed of the nonvolatile memory device.

* * * * *